(12) United States Patent
Shinkai

(10) Patent No.: US 6,385,624 B1
(45) Date of Patent: May 7, 2002

(54) FILE SYSTEM CONTROL METHOD, PARALLEL FILE SYSTEM AND PROGRAM STORAGE MEDIUM

(75) Inventor: Yoshitake Shinkai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/042,798

(22) Filed: Mar. 17, 1998

(30) Foreign Application Priority Data

May 29, 1997 (JP) ............................................. 9-139472

(51) Int. Cl.[7] ............................................. G06F 17/00
(52) U.S. Cl. .......................... 707/201; 707/10; 707/200; 709/200; 709/201
(58) Field of Search .............................. 707/1–206, 507; 709/100–332; 710/39–132; 711/131

(56) References Cited

U.S. PATENT DOCUMENTS

| | | | | |
|---|---|---|---|---|
| 4,831,552 A | * | 5/1989 | Scully | 707/507 |
| 4,853,843 A | * | 8/1989 | Ecklund | 707/203 |
| 5,157,776 A | * | 10/1992 | Foster | 711/131 |
| 5,208,914 A | * | 5/1993 | Wilson et al. | 710/39 |
| 5,261,059 A | * | 11/1993 | Hedberg et al. | 710/132 |
| 5,852,747 A | * | 12/1998 | Bennett et al. | 710/40 |
| 5,918,020 A | * | 6/1999 | Blackard et al. | 709/228 |

FOREIGN PATENT DOCUMENTS

JP 4-80841 3/1992

* cited by examiner

Primary Examiner—Thomas Black
Assistant Examiner—David Jung
(74) Attorney, Agent, or Firm—Staas & Halsey LLP

(57) ABSTRACT

A control method, storage medium and file system for use with a network file system in which a plurality of nodes of computers share a file over a network, each of the nodes storing read data or write data for the file in a buffer, the method including storing, when a file update is made by the node, the updated data in the buffer in the node until consistency about the updated data is needed by a program that runs on the node; making a notification of the file update to the other nodes when consistency about the updated data is needed by the program; checking, when the notification is made, whether or not the data in the buffers in the other nodes corresponds with the data to be updated; and making if the data corresponding with the updated data is found by the checking, the data in the other nodes invalid.

22 Claims, 14 Drawing Sheets

FILE SYSTEM CONTROL METHOD, PARALLEL FILE SYSTEM AND PROGRAM STORAGE MEDIUM

BACKGROUND OF THE INVENTION

1. Field of the Invention

The present invention relates to a file control method for a file system (parallel file system) adapted for a parallel program running on a parallel computer system in which multiple computers are interconnected by a high-speed network, a parallel file system, and a program storage medium for implementing that parallel file system.

2. Description of the Related Art

As a technique of increasing the speed with which a file on I/O node computers (called server nodes) is accessed by multiple computers on which a user program runs (called client nodes) over a network, the client cache system is well known in which a cache is installed on the client side to minimize the amount of data transferred between the client and the server.

However, the client cache system has a problem that, in the environment in which the so-called "write share" in which multiple nodes update a shared file concurrently is generally used, the overhead for acquisition control of right of access to the client cache and processing of making cache data invalid increase.

To solve this problem, the client cacheless system is frequently used which permits communication with the server node each time a read/write request is made by a user program. However, this system has a drawback that, when read/write data used by the user program is small in length, the communication overhead increases sharply and moreover the I/O node striping effectiveness is lost.

As a technique of allowing the data length of read/write request used by the user program to be large in the client cacheless environment, a stride access interface has been proposed. The stride access interface services access to more than one portion of a file in a single read/write request by declaring a discrete sequential access pattern for the file. For example, when the user program desires to make access to discrete data in a certain file, such as 200 bytes of data from the 1000th byte, 200 bytes of data from the 2000th byte, and 200 bytes of data from the 3000th byte, the stride access interface services that access in a single read/write request by declaring a pattern in which data to be accessed are placed.

As compared with the case where read/write requests are issued individually, the stride access interface provides optimization of a file system and higher utilization of the network.

A disk storage unit (hereinafter referred to as a disk), which is an important ingredient of a parallel file system, can exhibit the highest performance when accessed sequentially. When accessed randomly, on the other hand, the disk suffers from considerable degradation in performance due to the seek time and rotational latency time. As a technique of evaluating stride access interface requests issued by two or more client nodes and declared to be related to each other and converting disk accesses to a sequential one by taking advantage of such characteristics of the disk, the collective I/O system is known.

In the collective I/O system, the server node schedules disk accesses and data transfers and handles related access requests issued by all related client nodes collectively to carry out input/output (I/O) operations, thereby minimizing the number of disk accesses and the time required for data transfers.

Conventional parallel programs for write share of a file contain logic to assure data consistency without fail. FIG. 1 shows a general operation of a parallel program adapted for write share of a file. Process 2A (process 1) and process 2B (process 2) are sub-programs that make up a parallel program and run on different compute nodes 1A and 1B. Process 2A sends a message to process 2B on the other compute node 1B to thereby make notification that a file 8 has been ready for processing.

That is, the parallel program for write share should contain a process (notify node B) of notifying the parallel program running on the other compute node of a file having been updated and does not rely on only timing-dependent sequential consistency.

SUMMARY OF THE INVENTION

The stride access interface and the collective I/O techniques are useful in significantly improving the input/output operations of a parallel program. However, they have a drawback of requiring considerable amendments to an existing program because they greatly differ from an existing file access interface, for example, the UNIX system, which supposes a parallel program, and a user program needs a great large of I/O buffers.

The client cache system, although having advantages of the capability of servicing small size read/write requests in an efficient manner and moreover permitting an existing program to be used without being amended, has a drawback of requiring a significant overhead for keeping cache consistency.

It is therefore an object of the present invention to improve the performance of a parallel file system without the need of considerable amendment to an existing program.

According to an aspect of the present invention, in a network file system in which multiple compute nodes share files over a network, each compute node comprises a file update notification facility for, when a file update is made by a compute node, notifying other compute nodes of the file update, and each compute node stores read data or write data for the file in a buffer in the compute node. A program that runs on a node calls the file update notification facility when consistency for file update data is needed, and the file update notification facility invalidates the data corresponding to the file update data that each compute node stores in its buffer.

The buffering in each node is performed only for data that has been actually written. Unlike cache control, therefore, there is no need of exclusive control for preventing multiple nodes from simultaneously updating the same cache line, allowing multiple nodes to operate in parallel. Since only modified portions are held, a file will not be destroyed even if an I/O node merges two or more write requests made by the compute nodes. Thus, the concurrent updating of a file by two or more nodes can be made fast without destroying the file.

In particular, an existing parallel program which carries out write share of a file simply declares the inventive control to be put into effect at the time of opening a file and adds a statement to call (propagate) the file update notification facility to statements of the program that notify the other nodes that a file update has been performed. That is, minimal modifications to the existing parallel program can improve its performance.

According to another aspect of the present invention, in a network file system in which multiple client nodes share a file striped on multiple server nodes over a network, each client node temporarily stores data for which a write request is issued by a user program into buffers and passes the data on to multiple server nodes collectively at the time when the buffers become full or the buffer contents reach a predetermined amount, and, for a read request issued by the user program, each client node reads-ahead data from the server nodes into the buffers collectively, and, for subsequent read requests, copies data read-ahead into the buffers into a user buffer in the user program.

Even with a user program involving many write requests for data of small length, since data are temporarily stored in the buffers and, when the buffers become full, the data are sent to the multiple server nodes in parallel, the effectiveness of I/O node striping can be displayed fully irrespective of data length. Even in the environment in which read requests for data of small length are frequently made, since data are read-ahead by the amount equal to the size of the buffer into the buffers collectively from all server nodes, throughput proportional to the number of server nodes can be attained irrespective of data length.

Each client node has a buffer for each of the server nodes on which a file is striped. If, when one of the buffers is filled with data for which a write request is issued by the user program, a predetermined amount of data is stored in the other buffers, data in all these buffers are sent to the server nodes simultaneously.

Thus, the buffers can be used as buffers for communication with the server nodes without modification. This reduces the number of useless memory copy processes, such as from user buffers to system buffers and from system buffers to communication buffers: That, when one buffer becomes full, data in the buffers for the other server nodes are sent simultaneously, allows high throughput proportional to the number of the server nodes to be attained even in the environment in which there are many read/write requests for data whose length is small as compared with the stripe width.

According to still another aspect of the present invention, in a network file system in which multiple client nodes share a file placed on one or more server nodes over a network, upon receiving from one of the client nodes a request for access to an area of a storage medium which is contiguous to an area to which the immediately preceding access is made, each of the server nodes check whether requests issued by the other client nodes have been received and, when received, arrange the requests so that storage medium accesses are made in the order of ascending addresses.

When the user programs running on the client nodes all make requests for access to a file on a disk in the order of ascending addresses but noncontiguously, the access requests made by all the client nodes are evaluated and arranged so that the disk accesses are made in sequential order. This reduces the latency time and the seek time for the disk in which the file is stored.

According to a further aspect of the present invention, in a network file system in which multiple client nodes share a file placed on one or more server nodes over a network, the server node comprises switching means for switching the storage medium access mode between the sequential mode, in which access requests are arranged in the ascending order of storage medium addresses and the non-sequential mode in which access requests are processed in the order in which they were accepted. And the server node monitors whether access requests made by the client nodes are in the ascending order of storage medium addresses for each of the client nodes. The server node switches from the non-sequential mode to the sequential mode when a predetermined number of access requests in the ascending order of storage medium addresses is received in succession from each of the client nodes, and the server node switches from the sequential mode to the non-sequential mode when an access request that is not in the ascending order of storage medium addresses is received from either of the client nodes.

The automatic switching between the sequential mode and the non-sequential mode allows contiguous access consisting of multiple access requests to be serviced in an efficient manner. For noncontiguous access requests, waiting time and arranging time for the requests can be reduced.

The program that is run on the client node or server node to implement the above processing can be stored in a computer-readable storage medium.

BRIEF DESCRIPTION OF THE DRAWINGS

The present invention will be more apparent from the following detailed description, when taken in conjunction with the accompanying drawings, in which.

DETAILED DESCRIPTION OF THE PREFERRED EMBODIMENT

Figure 1:
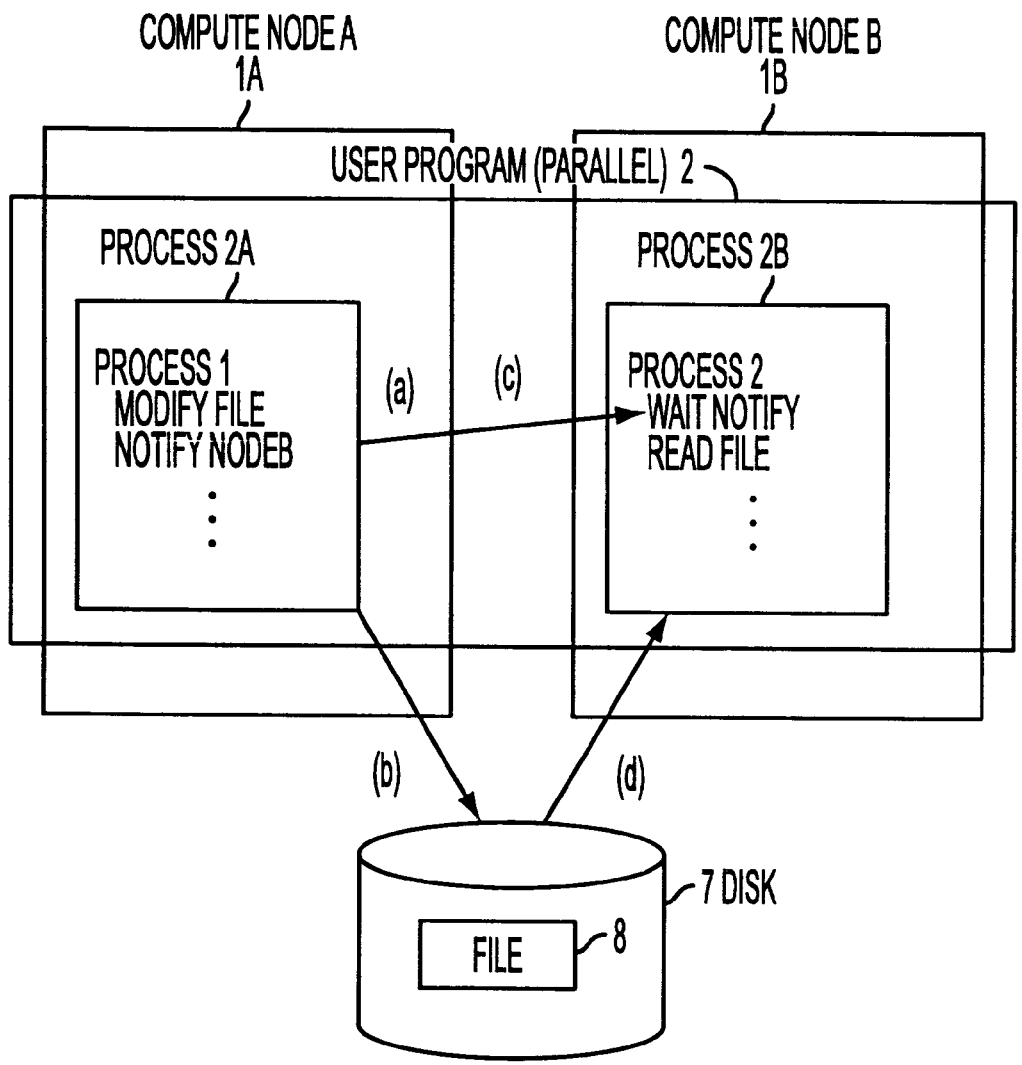
FIG. 1A and FIG. 1B illustrate a general operation of a parallel program carrying out write share of a file.
Figure 2:
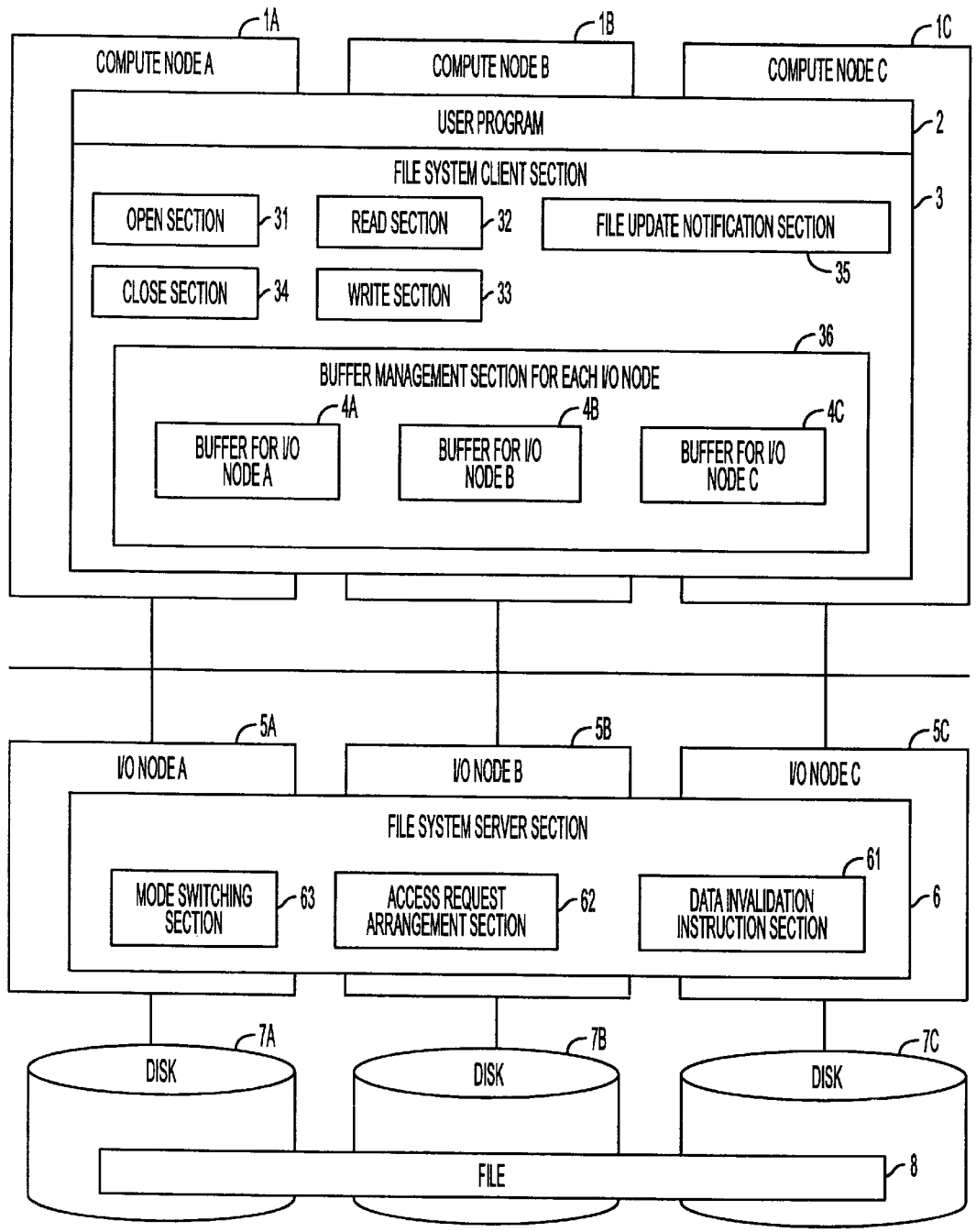
FIG. 2 is a schematic of a system in accordance with the present invention.

Referring now to FIG. 2 there is illustrated in god block diagram form an embodiment of a system of the present invention. In this figure, 1A to 1C denote compute nodes (or client nodes) that run a parallel program, 2 a user program (parallel program) that runs in parallel on the compute nodes 1A to 1C, 3 a file system client section that accepts I/O requests issued by the parallel program, 4A to 4C buffers each provided for a separate I/O node, 5A to 5C I/O nodes that perform I/O operations on a file, 6 a file system server section that responds to requests by the file system client section 3 to actually make access to disks placed on the I/O nodes, 7A to 7C disks for storing a file, and 8 a file whose data are placed on the disks 7A to 7C in the form of stripes (i.e., file data is divided into sections of equal size and the sections are placed on the respective disks).

Here, the user program 2 resides on each of the compute nodes 1A to 1C. Hence, the buffers 4A to 4C reside in the compute nodes 1A to 1C, respectively. Also, the file system server section 6 resides in each of the I/O nodes 5A to 5C.

The compute nodes 1A to 1C are client nodes, whereas the I/O nodes 5A to 5C are server nodes. The client nodes and the server nodes are interconnected by a high-speed network. Although, in this example, three compute nodes 1A to 1C are shown, a requirement is that more than one compute nodes are used. For the I/O nodes, although three I/O nodes 5A to 5C are shown, any number of nodes may be used.

In each of the compute nodes 1A to 1C, the user program 2 comprising a parallel program and the file system client section 3 are operated, while, in each of the I/O nodes 5A to 5C, the file system server section 6 is operated. The file system client section 6 is provided in the form of a program library as an example and linked with the user program 2. Of course, the file system client section 3 may be incorporated as a portion of an operating system independently of the user program 2.

The file system client section 3 is provided with an open section 31 for opening a file 8 as requested by the user program 2, a read section 32 for processing read requests, a write section 33 for processing write requests, a close section 34 for closing the file 8, a file update notification section 35, and a buffer management section 36 for the I/O node buffers 4A, 4B and 4C.

The file system server section 6 is provided with a data invalidation instruction section 61 which, when notification is received from the file update notification section 35 in a certain compute node 1A to 1C, instructs the file update notification section 35 in the other related compute nodes 1A to 1C to invalidate update data, an access request arrangement section 62 for arranging requests for access to each disk 7A to 7C in the order of ascending disk addresses, and a mode switching section 63 for switching the disk access mode between sequential and non-sequential modes.

In the file system client section 3, the buffer management section 36, which resides in each compute node 1A to 1C, manages the buffers 4A, 4B and 4C corresponding to the I/O nodes 5A, 5B and 5C, respectively.

The file system client section 3 for a certain compute node stores file update data into a buffer in the compute node until the file update notification section 35 is called (propagated) by the user program 2 and, when the file update notification section is called, notifies the file system server section 6 of a file update. When notified of a file update, the file system server section 6 checks data read-ahead by the other compute nodes and, as required, causes the data invalidation instruction section 61 to instruct the file update notification section 35 for the other compute nodes to invalidate that data as a result of the file update. Upon receipt of that instruction, the file update notification section 35 invalidates the read-ahead data in the corresponding buffers.

The read section 32 responds to read requests made by the user program 2 to read-ahead data requested and succeeding data collectively from the I/O nodes 5A to 5C into the buffers 4A to 4C. When a succeeding read request is made, the read section 32 copies the data in the buffers 4A to 4C corresponding to the read request into user buffers in the user program 2.

The write section 33 temporarily stores data for write requests made by the user program 2 into the buffers 4A to 4C and then transfers the write requests to the I/O nodes 5A to 5C collectively when the buffers 4A to 4C have become full.

The request access arrangement section 62 in the file system server section 6, upon receipt of a request for access to a disk area that is noncontiguous to an area for which an immediately preceding access request has been made, checks whether requests by the other clients (compute nodes) have been received. If the requests by the other clients have been received, the section 62 arranges the requests so that the disk accesses are made in the order of ascending disk addresses and performs I/O processes in that order.

The mode switching section 63 in the file system server section 6 switches the disk access mode between the sequential mode in which access requests from the file system client section 3 are arranged in the order of ascending disk addresses and processed, and the non-sequential mode in which access requests are processed in the order in which they were accepted. The mode switching section 63 monitors access requests issued by the file system client section 3 for each compute node to determine if they are in the order of ascending disk addresses. When access requests in the order of ascending disk addresses are made by all the compute nodes 1A to 1C a predetermined number of times or more, the mode switching section switches the access mode to the sequential mode. When access requests are made by either of the compute nodes 1A to 1C which are not in the order of ascending disk addresses, on the other hand, the mode switching section switches the access mode to the non-sequential mode.

The user program 2 can declare whether to utilize the above facility or not in making an open request to the file system client section 3. If it is declared that the above facilities are not utilized, then file access control is performed which is similar to that in the conventional system. In order for an existing parallel program (user program) for carrying out write share of a file to utilize the facility of the present invention without great modification, it simply declares at the time of opening a file to put the facility of the present invention into effect and adds a statement to call (propagate) the file update notification section 35 to program statements which notify the other nodes of a file update. In the case of a serial program, the file system client section 3 automatically puts the inventive facility into effect.

Since, as described previously, conventional parallel programs for write share contain a process of notifying the parallel program running on the other compute node of a file update, it is very easy to add to the existing programs statements to reflect the results of writing in the other nodes. What is further needed for program modification is only to add a parameter indicating the utilization of the inventive facility to statements for opening a file.

Thus, in order for user programs to make use of an improvement in the performance of parallel file access according to the present invention, it is required only that some modifications are made to existing parallel programs. There is no need of changing logic itself. In the case of a serial program, the system automatically puts the inventive facility into effect, which achieves constantly high performance with no modifications to existing programs and irrespective of the length of data for read/write requests.

Hereinafter, the embodiment of the present invention will be described in more detail.

1 Reservation of Buffers

The file system client section 3, upon receipt of notification from the user program 2 that the inventive system is put into effect in making a request to open a file, determines I/O nodes 5A to 5C to be used and then initializes corresponding buffers 4A to 4B.

When a read/write request is issued by the user program 2, the read section 32 or the write section 33 in the file system client section 3 is operated to process that request using the buffers 4A to 4C. Hereinafter, the buffers 4A to 4C are referred to as coherent buffers.

2 Arrangement of Coherent Buffers

Figure 3:
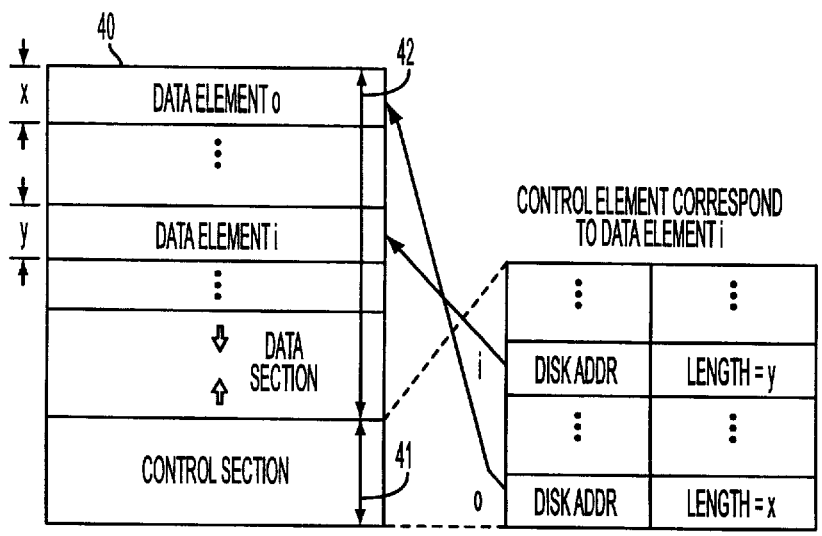
FIG. 3 shows an arrangement of a coherent buffer.

FIG. 3 shows an arrangement of a coherent buffer.

The coherent buffer, indicated at 40, comprises a control section 41 for managing data in the buffer and a data section 42 into which actual data are entered. The control section 41 takes a form to expand from bottom to top within the buffer, while the data section 42 expands from top to bottom.

The control section 41 consists of a set of control records (control elements), one control record indicating a disk access request (a write request) for one I/O node. In the i-th control record in the control section 41 are stored a disk address of data stored in the i-th data element in the data section and the length of that data.

When the address for a new I/O request made by the user is not contiguous to the address for a disk access request indicated by the last control record, the control section 41 is expanded upward to make a new control record, in which a disk address and data length associated with the new disk access request are stored. When the address for the new I/O request is contiguous to the address for the disk access request indicated by the last control record, the length of data for which that I/O request is made is added to the data length contained in the last control record, thereby updating the last control record and resulting in one I/O request.

3 Write Processing

Figure 4:
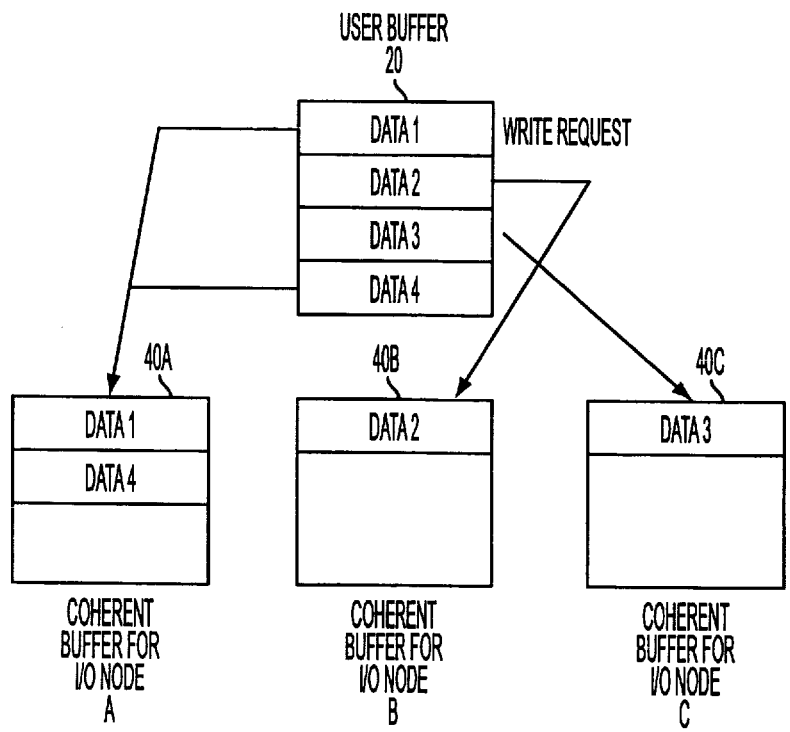
FIG. 4 shows an example of a setting of data in buffers at the time of a write request.

FIG. 4 shows an example of a setting of data in the buffers at the time of a write request. With reference to FIG. 4, a description is given of how a write request issued by the user program 2 is processed in relation to the buffers.

When the user program 2 specifies an in-program user buffer 20 in which data to be written is stored and issues a write request, the write section 33 in the file system client section 3 receives control. The write section 33 then divides data in the user buffer 20 specified by the write request, into pieces of data assigned to the I/O nodes 5A to 5C in accordance with I/O node striping specified in advance and places the resulting pieces of data into the corresponding coherent buffers 40A to 40C. In this example, the I/O node striping is set such that, of data in the user buffer 20, data 1 is assigned to the coherent buffer 40A for I/O node A, data 2 to the coherent buffer 40B for I/O node B, data 3 to the coherent buffer 40C for I/O node C, and also data 4 to the coherent buffer 40A for I/O node A.

When the coherent buffers 40A to 40C have become full, the write section 33 sends the respective contents in the coherent buffers to the file system server 6 on the corresponding I/O nodes 5A to 5C and waits for its response. Upon receipt of the response from the file system server section 6, the write section loads next data into the corresponding coherent buffers 40A to 40C from the top thereof. For a write request for data that is short in length, therefore, data are only moved from the user buffer 20 to the coherent buffers 40A to 40C and conversation with the file system server 6 is delayed until either of the coherent buffers 40A to 40C become full.

If data for which a write request is made is sufficiently long in length, then all the coherent buffers will become full in a single write request. In this case, all the I/O nodes 5A to 5C can be run in parallel.

However, if the length of data for a write request is shorter than the coherent buffer length, only one buffer will become full. As a result, there arises the possibility of conversation with only one I/O node. Under such a situation, the disks 7A to 7C associated with the I/O nodes 5A to 5C cannot be driven in parallel and the effectiveness of I/O node striping cannot be displayed fully.

In order to enable the I/O node striping effectiveness to be displayed even in the environment in which there are many write requests for data of small length, the system is arranged such that, when one coherent buffer becomes full, the state of the other coherent buffers is examined, and when at least a predetermined amount of data has been loaded into those buffers (e.g., the buffers are each at least 50% full), the data in the buffers are also sent simultaneously to the corresponding I/O nodes.

Figure 5:
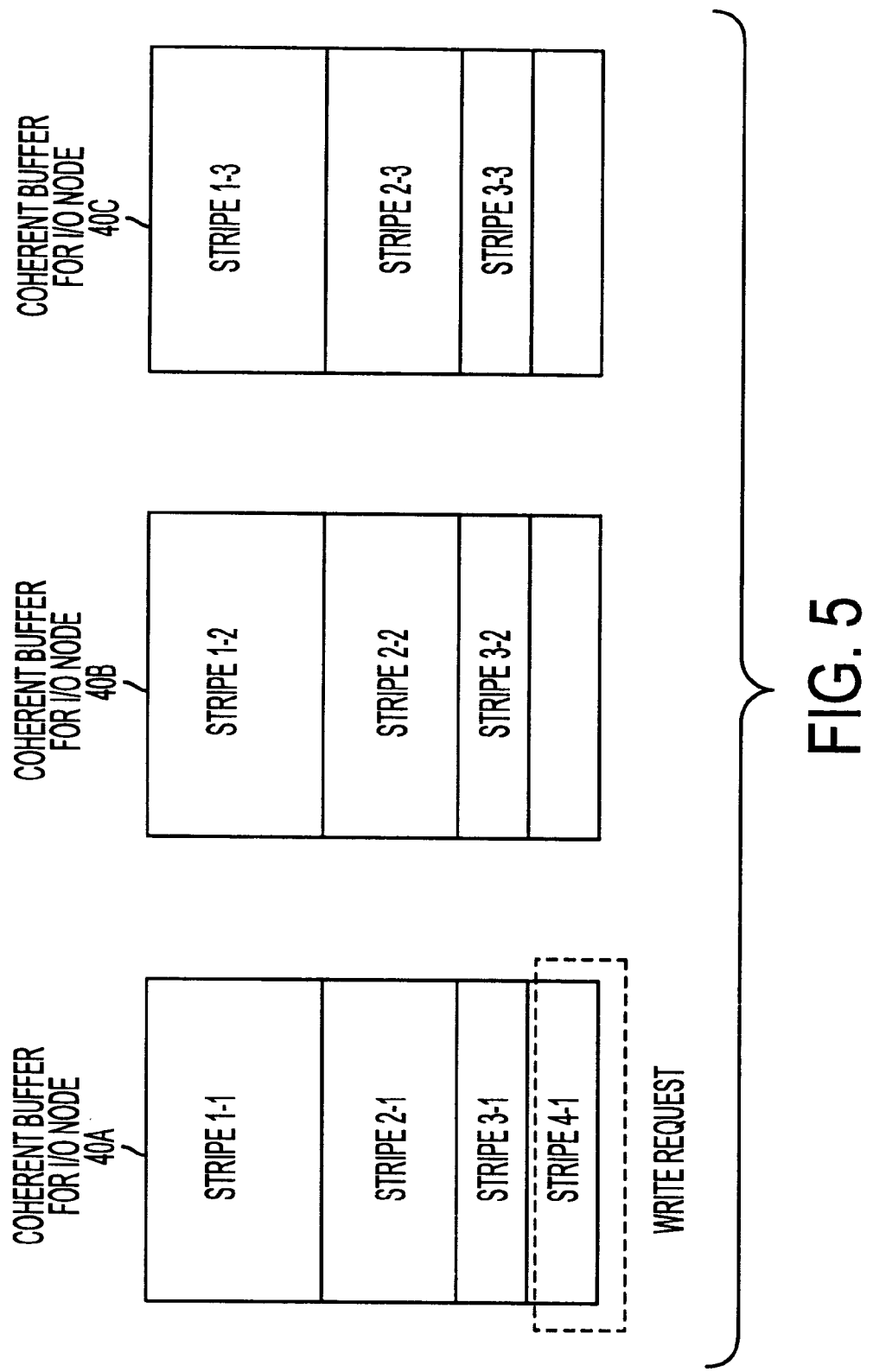
FIG. 5 shows an example of parallel transfer at the time of a write request under the condition where a buffer is full.

FIG. 5 shows an example of a parallel transfer at the time of a write request in the buffer full state. With reference to this diagram, a description will be given of processing when the coherent buffer 40A has become full as a result of the user program 2 having issued a write request.

Suppose here that the user program 2 has made a write request for data in stripe 4-1. This data makes only the coherent buffer 40A for I/O node A become full. Inherently, the write request will be fulfilled simply by transferring only the data in the coherent buffer 40A for I/O node A to the file system server section 6. However, from the standpoint of parallel disk access in the I/O nodes 5A to 5C, this is not desirable in efficiency. Thus, when the other buffers 40B and 40C have room to store more data, but they are at least 50% full, the data in the buffers 40A to 40C are transferred simultaneously to the file system server section 6.

This control allows any program in which there are many write requests for data of small length to implement parallel I/O operations at a high speed proportional to the number of stripings. The file system server system 6 on each of the I/O nodes 5A to 5C examines the transferred contents of the corresponding buffer and then makes access to the corresponding disk.

With multiple access requests for contiguous disk addresses are received, they are grouped together on the client side, i.e., the compute nodes (1A to 1C) side. For this reason, the number of control records for such access requests to be sent to the file system server section 6 is reduced to one, and the file system server section 6 simply issues a single disk access request to the corresponding local file system.

With discrete access requests for non-contiguous disk addresses, a control record is created for each of the write requests issued by the user, and consequently multiple disk access requests are passed on to the file system server section 6. In this case, the file system server section 6 retrieves each of the write requests stored in the received data in sequence for processing.

9 Read Processing

Read requests are processed by the read section 32 in the file system client section 3. For read processing, the coherent buffers 40A to 40C each serve as a read-ahead buffer. When required data have already been entered into the coherent buffers, the read section copies the data in the buffers into the user buffer 20. At this point, no communication with the I/O nodes 5A to 5C takes place.

In the absence of required data in the coherent buffers 40A to 40C, the read section decides whether to read-ahead or not on the basis of a relation between the latest request and this read request. That is, if the latest request for the same I/O node is also a read request and the difference between the starting disk address of data for which this request is made and the ending disk address of data for which the latest request was made is less than a predetermined amount (e.g., less than half of the coherent buffer length), then data are read-ahead into the coherent buffer by the amount corresponding to the buffer size.

When the difference between the addresses is more than half of the buffer size, no data read-ahead is performed as a result of the determination that the read-ahead overhead will offset the advantage of a hit on the buffer in the next access.

Figure 6:
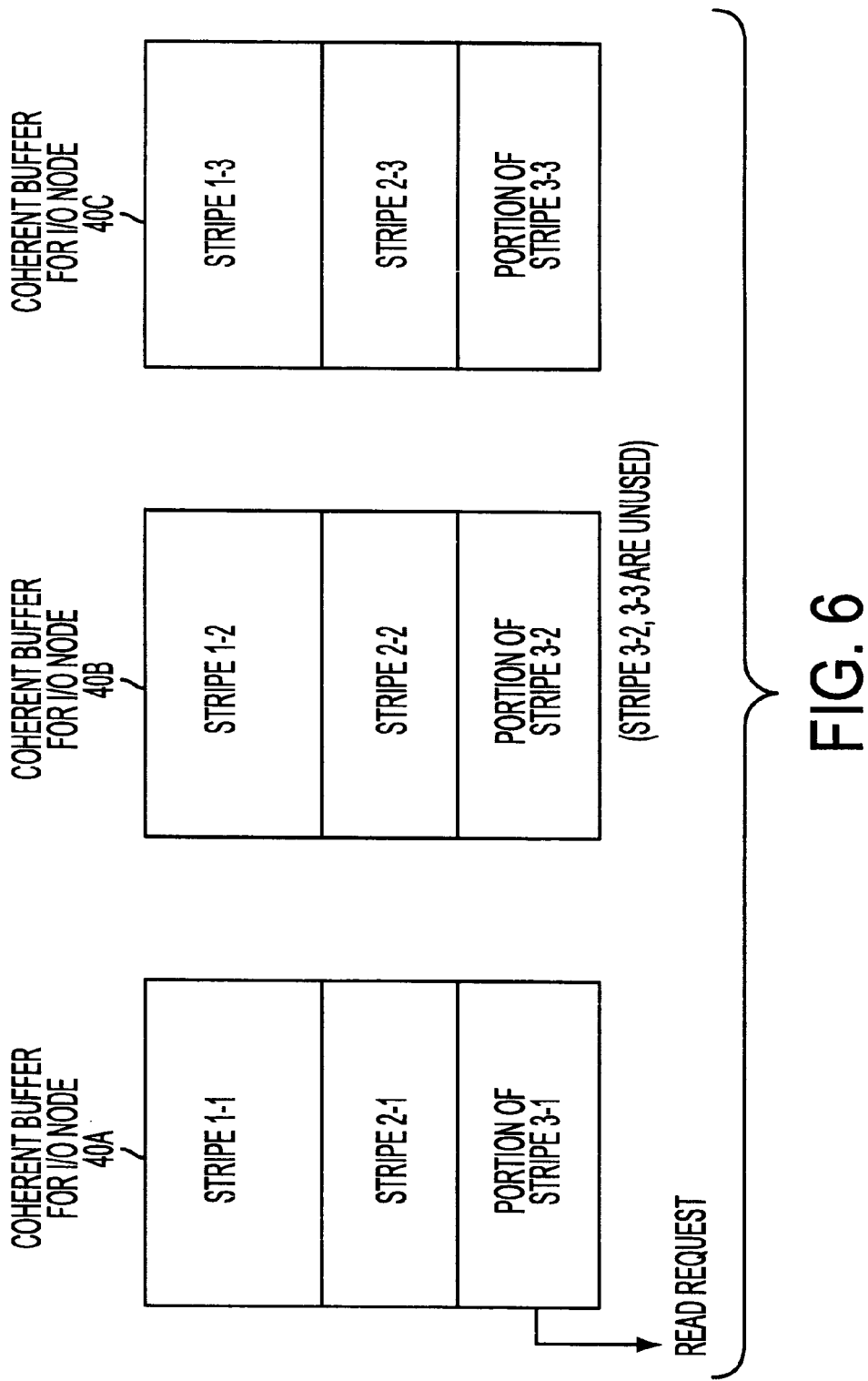
FIG. 6 shows an example of simultaneous reading into the buffers at the read time.

FIG. 6 shows an example of simultaneous reading into the buffers at the time of a read request. With reference to the diagram, a description will be given of processing when the user program 2 issues a read request, so that data in the buffers are exhausted.

In order to display the I/O node striping effectiveness even in the environment in which there are many read requests for data of small length, the system is arranged such that, when a need arises to read-ahead into a coherent buffer, an amount of data in the other coherent buffers is examined and, when at least a predetermined amount of data (e.g., half or more) in those buffers have already been transferred to the user, concurrent reading-ahead into the buffers is activated.

Suppose for example, that, as shown in FIG. 6, a portion of stripe 3-1, a portion of stripe 3-2 and a portion of stripe 3-3 have been read-ahead into the coherent buffers 40A, 40B and 40C, respectively, and other data in the buffers have already been transferred to the user buffer 20 as requested by the user program 2. Further, suppose that the user program 2 makes a read request for the stripe 3-1 under those conditions. This read request would be fulfilled by reading data into the coherent buffer 40A alone. However, the system is arranged to read data into the coherent buffers 40B and 40C as well at the same time data is read into the coherent buffer 40A because most of data in the buffers 40B and 40C have been read. Note here that the same data as data already present in the buffers are not read into again.

When write data is left in a coherent buffer for which a read request has been made, the contents of that buffer are sent to the corresponding I/O node to update the file.

5 Propagate Processing

A propagate request issued by the user program 2 is processed by the file update notification section 35 in the file system client section 3.

Figure 7:
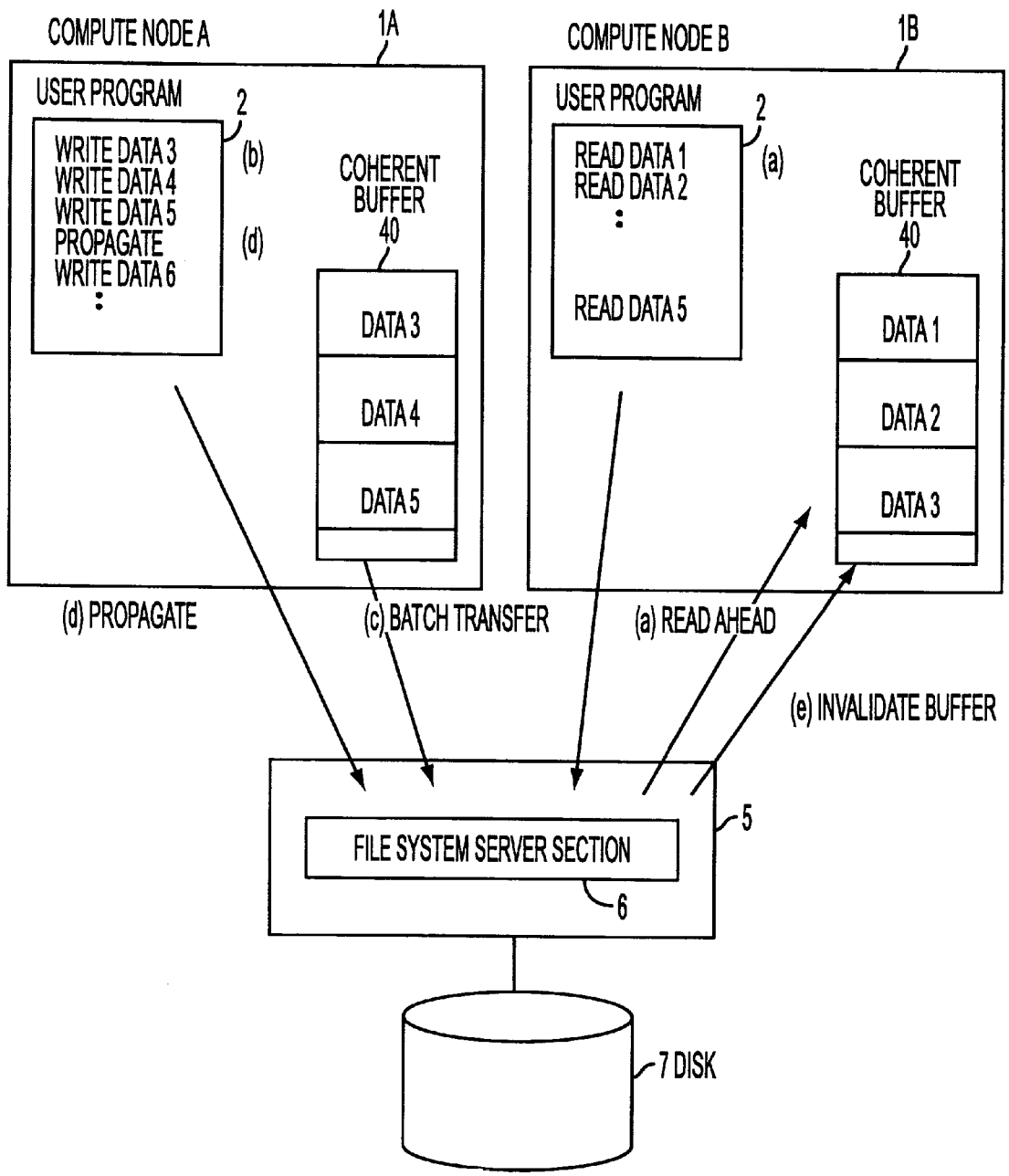
FIG. 7 shows a relationship between buffers and propagate requests (used for file update notification) made by user programs.
Figure 8:
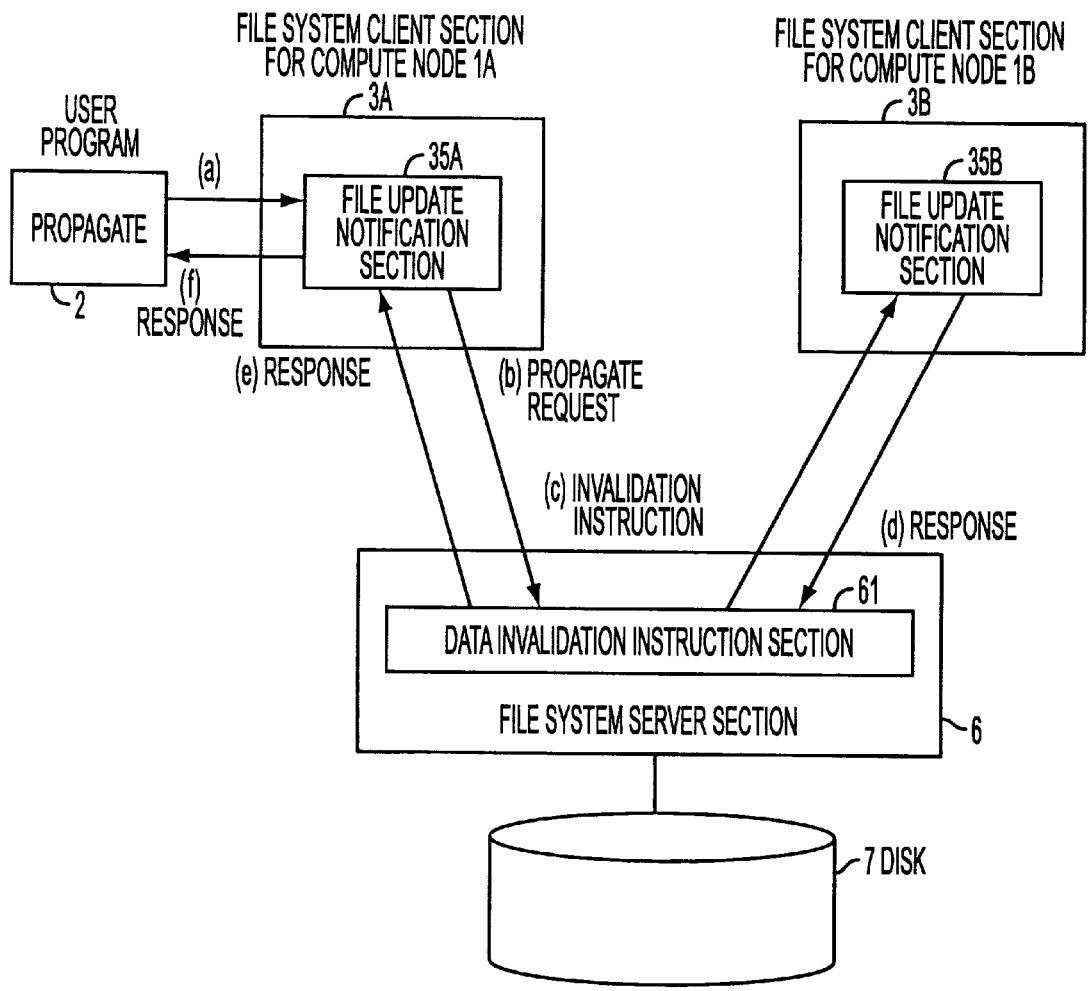
FIG. 8 is a diagram for use in explanation of propagate request processing.

FIG. 7 shows a relationship between the buffers and propagate requests made by the user program. FIG. 8 is a diagram for use in explanation of propagate processing.

The operation will be explained in accordance with (a) through (e) shown in FIG. 7.

(a) The user program 2 running on the compute node 1B makes a request to the file system server section 6 to read data 1. At this point, data 2 and data 3 are read-ahead together with data 1.

(b) The user program 2 running on the compute node 1A makes a request to write data 3, data 4, and data 5 to rewrite data. The user program 2 on the compute node 1B keeps running without being aware of that write request by the user program on the compute node 1A.

(c) When the coherent buffer 40 on the compute node 1A becomes full, an actual write request is made by the compute node 1A to the file system server section 6, so that the contents of the coherent buffer 40 are transferred collectively.

(d) The user program 2 on the compute node 1A issues a propagate request at a time when a guarantee of consistency for update data is needed. This request is presented to the file system server section 6 through the file update notification section 35.

(e) Upon receipt of the propagate request, the file system server section 6 checks data read-ahead into the coherent buffer 40 on the other compute node 1B, finds data (data 3) that needs to be invalidated, and instructs the compute node 1B to invalidate that data. Thereby, the data in the buffer on the compute node 1B is invalidated. If necessary, correct data is transferred to the user program 2 on the compute node 1B by processing an actual read request at a later time.

In the above processing, when a propagate request is issued by the user program 2, the contents of the buffer 40, even if it is not full, are transferred to the file system server section 6 together with the propagate instruction and then written to the corresponding disk 7.

The propagate processing will be explained in more detail in accordance with processes (a) through (f) shown in FIG. 8.

(a) As shown in FIG. 8, when a propagate request is made by the user program 2 at the time a guarantee of consistency for write data is needed, it is presented to the file update notification section 35A in the file system client section 3A of the compute node 1A on which that user program runs.

(b) The file update notification section 35A sends write data left in the coherent buffer 40A, with a propagate instruction appended, to the file system server section 6 on the I/O node. The file system server section 6 then causes the received write data to be reflected in the disk 7.

(c) The data invalidation instruction section 61 in the file system server section 6 finds data that needs to be invalidated from the other compute node which has data read-ahead into its associated coherent buffer and, provided that the buffer associated with the compute node IB contains that data needing to be invalidated, sends a message that instructs invalidation of that data to the file update notification section 35B on the compute node 1B. Upon receiving that message, the file update notification section 35B examines whether the read-ahead data is present in the coherent buffer and, in the presence of read-ahead data in the coherent buffer, invalidates that coherent buffer. As a result, subsequent read requests will be made to the file system server section 6 for new data.

(d) When the invalidation is completed, the file update notification section 35B returns the notification that the invalidation was completed to the file system server section 6 on the I/O node on which the request was made.

(e) The file system server section 6 notified of buffer invalidation completion returns a response to the file update notification section 35A of the file system client section 3A that made the propagate request.

(f) Further, the file update notification section 35A returns the notification that the propagate request has been serviced to the user program 2.

The above processing can provide a guarantee that changes to a file made by a client (compute node) before a propagate request is issued were certainly told to the other clients (compute nodes). The invalidation processing is performed only when old data that should be made invalid as a result of a data update has been read-ahead into client compute nodes. Otherwise, the file system server section 6 immediately returns a response to the file system client section 3 on a compute node that made a propagate request.

6 Close Processing

A close request made by the user program 2 for the file 8 is processed by the close section 34 in the file system client section 3. When write data are left in the coherent buffers 40A to 40C, the close section sends the contents of the buffers to the file system server section 6 of the I/O nodes 5A to 5C to make changes to the file 8.

7 Scheduling of Disk I/O Requests

The file system server section 6 on the I/O nodes 5A to 5C processes requests sent from the file system client section 3 as follows.

Disk access requests made by a user program running on a single node are processed in the order in which they are accepted.

For requests made by parallel programs running on multiple nodes, the mode switching section 63 monitors requests from the client nodes 1A to 1C for each node and controls switching between sequential and non-sequential modes.

Figure 9:
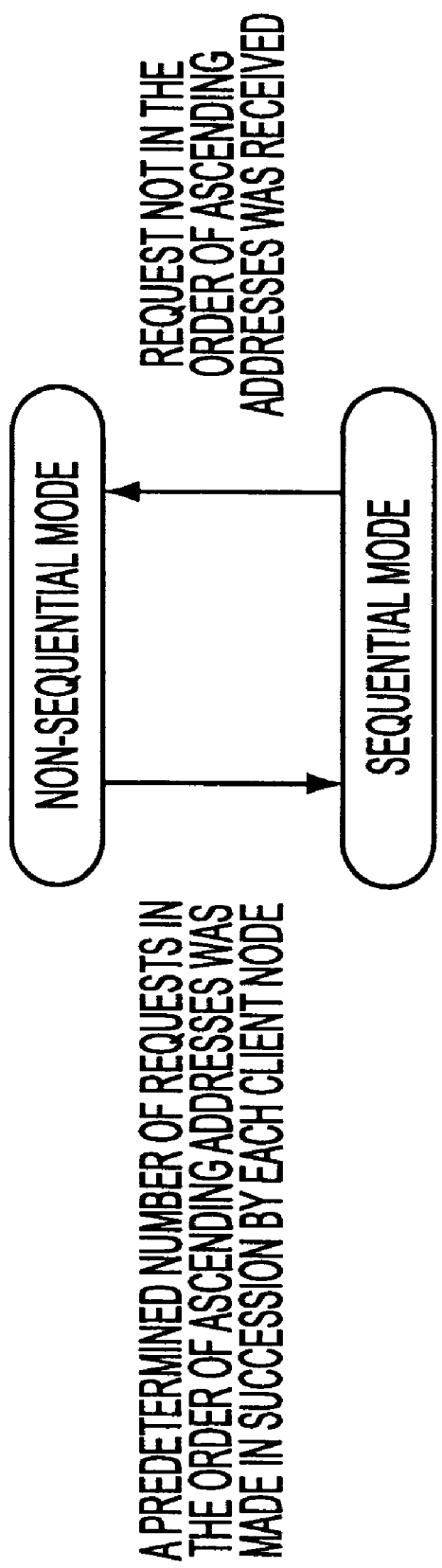
FIG. 9 shows the transition between sequential and non-sequential modes.

FIG. 9 shows the transition between the sequential and non-sequential modes.

The file 8 is placed in the non-sequential mode immediately after it is opened. The mode switching section 63 monitors requests issued by the client nodes 1A to IC for each node and changes the file access mode from the non-sequential mode to the sequential mode when a predetermined number of access requests is made in succession in the order of ascending addresses by each client node.

When, in the sequential mode, at least one request that is not in the order of ascending addresses is accepted, a change is made to the nonsequential mode. If, even when a change has been made to the non-sequential mode, a predetermined number of access requests is made successively in the order of ascending addresses by each client node, then a return is made to the sequential mode.

The disk I/O scheduling is performed only in the sequential mode, and disk access requests are processed under queue management. In the nonsequential mode, disk access requests are processed in the order in which they are accepted.

Figure 10:
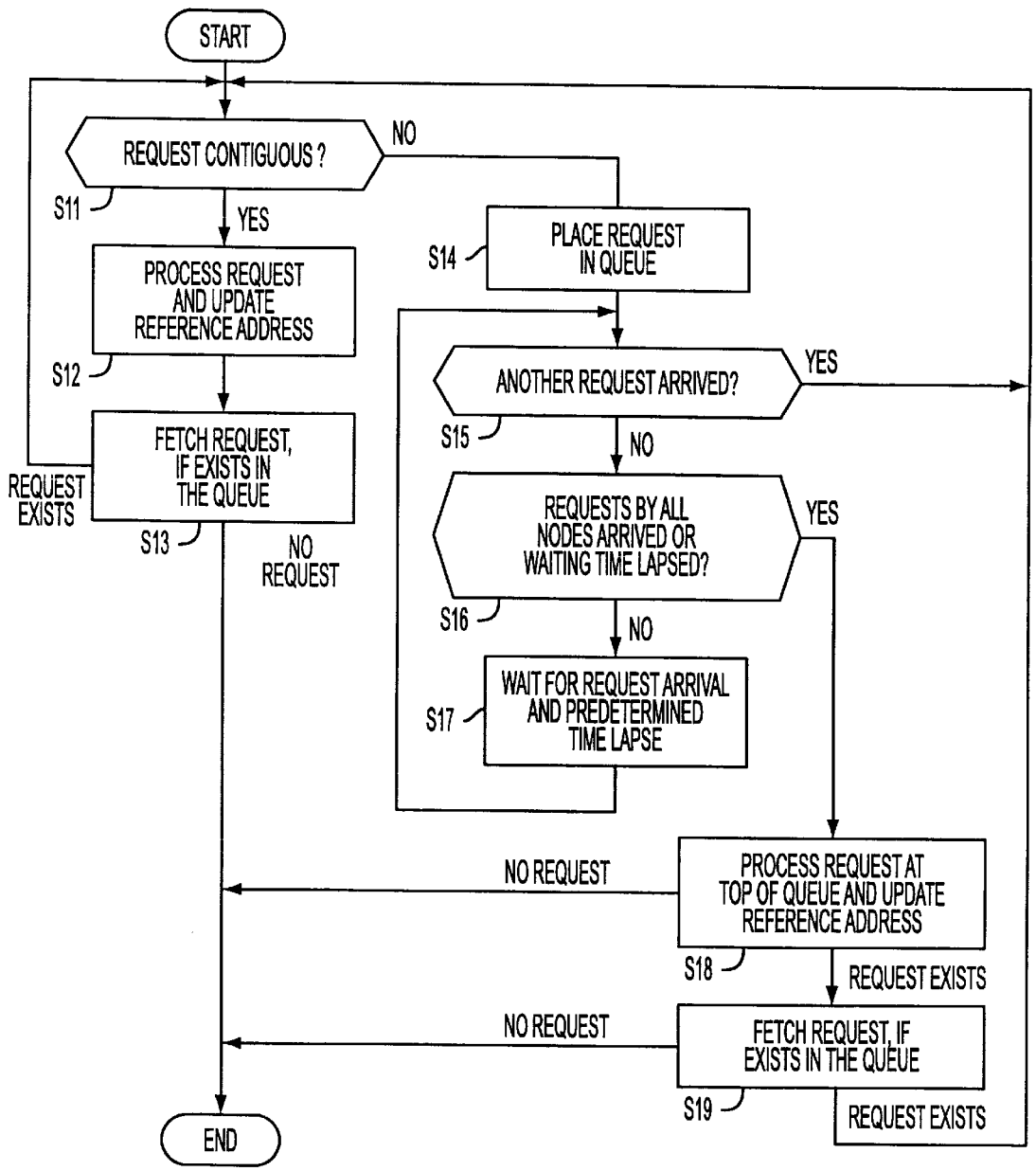
FIG. 10 is a flowchart for disk I/O scheduling in the sequential mode.

FIG. 10 is a flowchart for the disk I/O scheduling in the sequential mode, which particularly shows a method of processing read/write requests.

When a transition is made from the non-sequential mode to the sequential mode, the smallest one of ending addresses of disk accesses for which the last disk access requests were made by each client node is set as a reference address. In the figure, contiguous means that the starting address of a disk access for which an access request is made agrees with or is smaller than the reference address.

The file system server section 6 first examines whether an access request accepted is contiguous (step S11) and, when the starting address of a disk access on which that request is made is equal to or smaller than the reference address (YES), processes that request immediately and changes the reference address to the ending address of that disk access (step S12). Upon completion of disk access, a request at the top of a queue is fetched (step S13), and a return is made to step S11 to evaluate that request in accordance with the same criterion. If no request is placed in the queue, the processing is terminated to wait for a new request.

If the request accepted contains a starting address larger than the reference address (NO in step S11), it is placed in the request queue in which requests are placed in the ascending order of starting addresses (step S14).

Next, whether a request by another node has arrived is examined (step S15). If such a request has arrived, the procedure returns to step S11.

If the starting addresses of requests that remain delayed and that have arrived are all larger than the reference address and moreover there is a client node (compute node) from which no request has been received, then the file system server section waits for a request from that node for a predetermined period of time (steps S16 and S17). Requests that arrived during this period of time are evaluated in accordance with the same criterion.

When requests have arrived from all the nodes or no request is found that fulfills the criterion even after the predetermined waiting time, a request at the top of the queue that has the smallest starting address is processed and the reference address is updated (step S18). When this request is processed, another request is fetched from the queue (step S19), and a return is then made to step S11 to repeat the same checking process. If, in steps S18 and S19, no request remains in the queue, the procedure comes to an end. When new requests arrive, the same processing is performed.

If, in the above procedure, a request is found that is not in the order of ascending addresses, that request and queued requests are processed in sequence and then a transition is made to the non-sequential mode.

The present invention can also be implemented in the following way.

In the embodiment of the present invention described so far, the coherent buffers are provided to correspond in number to the I/O nodes and data to be transferred to each I/O node is retained in the corresponding coherent buffer. To further simplify control, it is possible to make a buffer have data to be passed on to the user program though a memory copy overhead increases. That is, a buffer can be provided which stores data for all the I/O nodes collectively so that its contents may be copied into each of the coherent buffers.

In addition, the embodiment of the present invention is arranged to wait for arrival of requests from all the compute nodes for a predetermined time for the purpose of arranging requests with accuracy in the I/O nodes. This may be modified in such a way as to arrange only requests that have already arrived.

Figure 11A:
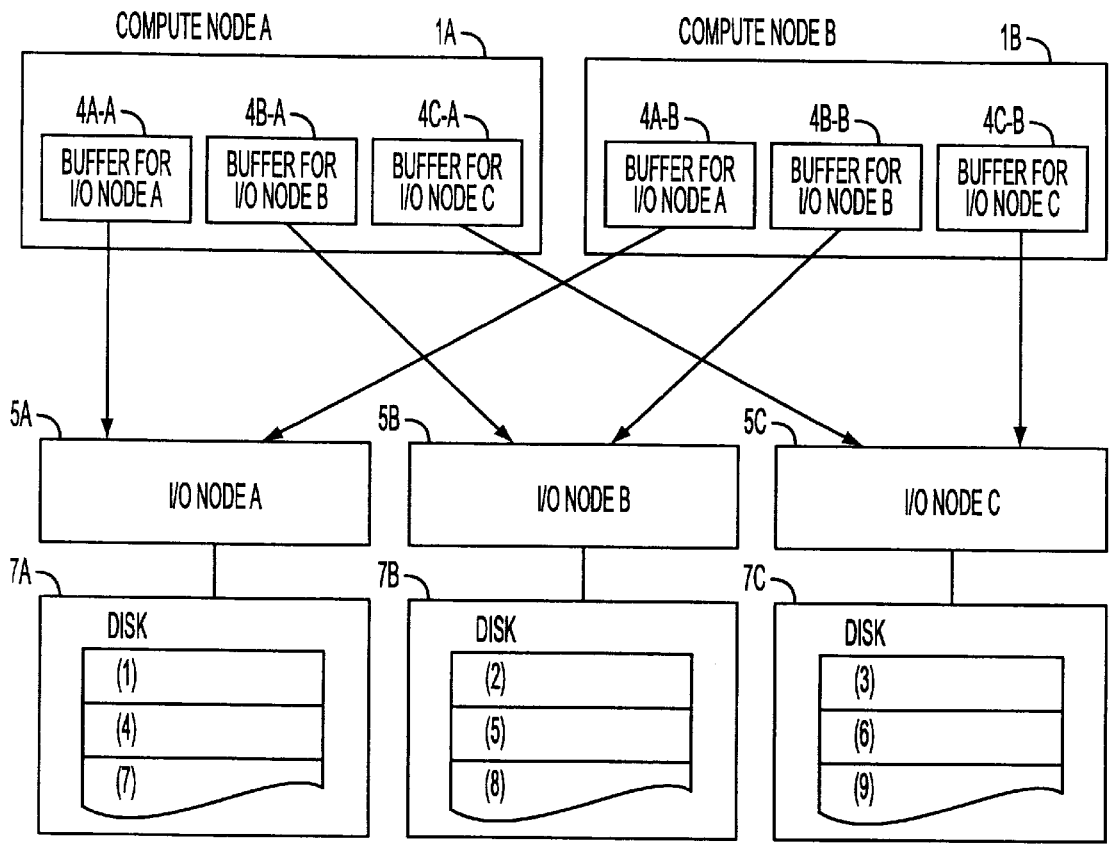
FIG. 11A is a conceptual diagram of write processing in accordance with the present invention.
Figure 11B:
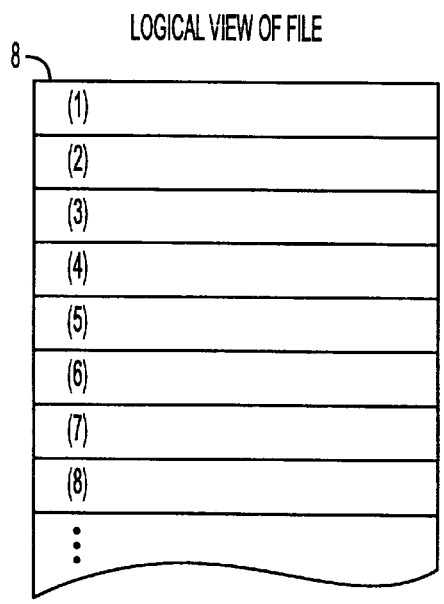
FIG. 11B is a logical view of a file written in accordance with the processing of FIG. 11A.

FIGS. 11A and 11B provide a conceptual view of write processing in accordance with the present invention. FIG. 11A shows the results of file updates by the compute node A (1A) and the compute node B (1B) in accordance with striping specification. As described previously, the compute node A has three buffers (4A-A, 4B-A and 4C-A) according to the striping specification and transfers data in each of the buffers to a respective corresponding one of I/O nodes A, B and C (5A, 5B and 5C). Likewise, the compute node B has three buffers (4A-B, 4B-B and 4C-B) according to the striping specification and transfers data in each of the buffers to a respective corresponding one of I/O nodes A, B and C (5A, 5B and 5C). This arrangement is the same as that shown in FIG. 2 except that the compute nodes are two in number. The in-buffer data thus transferred are arranged by the I/O nodes A, B and C (5A, 5B and 5C), then written on the disks (7A, 7B and 7C), as described previously.

FIG. 11B shows a logical view 8 of the entire file on the disks (7A, 7B and 7C) written in accordance with the file update processing shown in FIG. 11A. The striping specification herein is three to divide one logical file into three physical disks (7A, 7B and 7C) in predetermined units. Thus, data (1), (4) and (7) on the disk 7A, data (2), (5) and (8) on the disk 7B and data (3), (6) and (9) on the disk 7C form logically such a logical file as shown in FIG. 11B in the order of (1) to (9).

Figure 12:
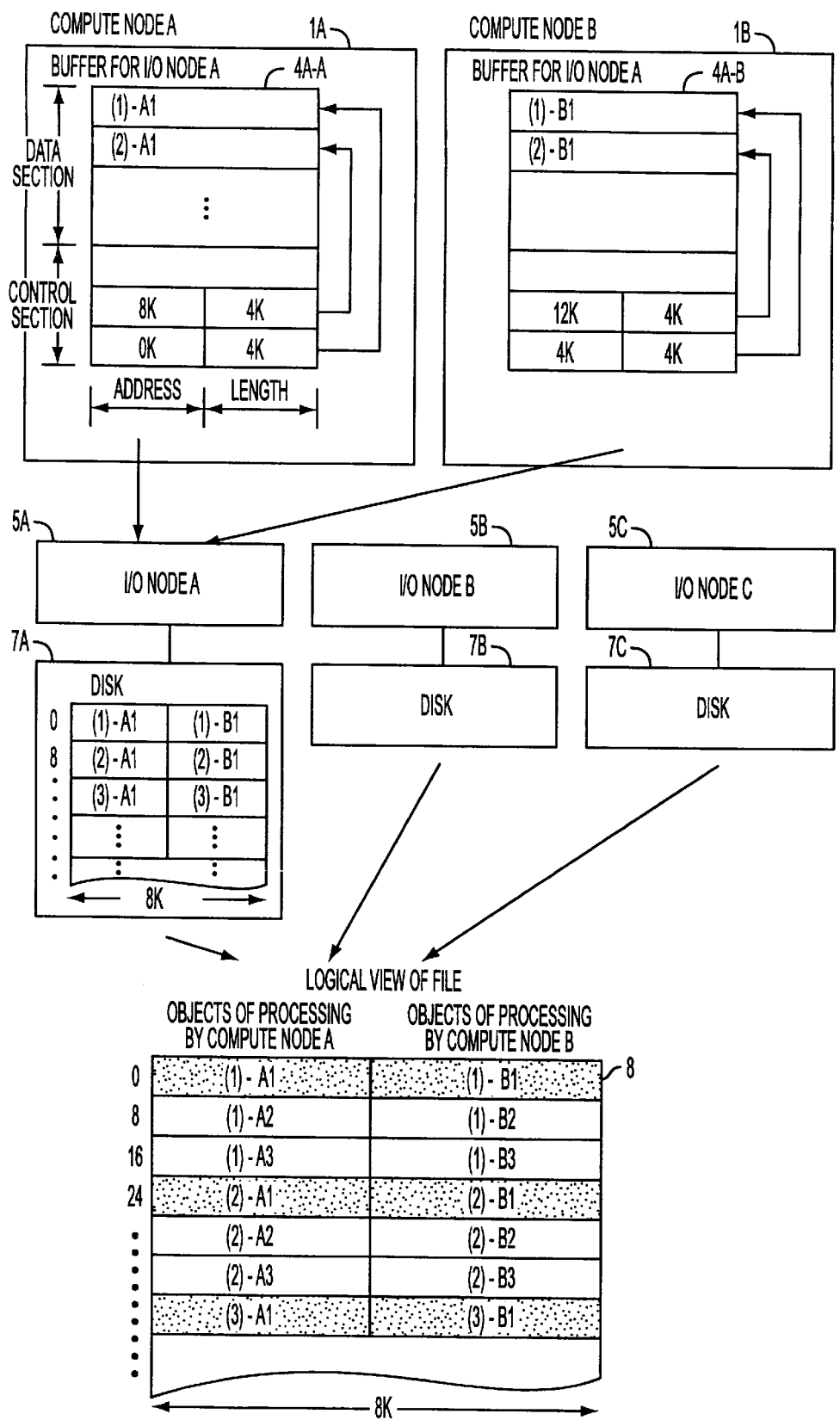
FIG. 12 is a conceptual diagram of an embodiment of the write processing in accordance with the present invention.

FIG. 12 shows how data transferred from the compute nodes A and B to the I/O node A are written on the corresponding physical disk and how they are related to the final logical view in the case where the unit of division for striping is 8 Kbits and the compute nodes A and B alternately write 4 Kbits of data. Although the unit of division for striping is here set to 8 Kbits, this is merely exemplary. The division can be made in bits, bytes, or blocks. For the I/O nodes B and C, though not shown in detail, the similar processing to the writing into the disk 7A by the I/O node A is performed. The logical view 8 of the file is shown as processing by these other I/O nodes having being performed.

The figures shown on the left side of the respective rows of the disk 7A and the file logical view 8 shown in FIG. 12 indicate the starting addresses of the respective rows in units of Kbits.

The inventive processing will be described in more detail with reference to FIG. 12. The compute node A and the compute node B perform processing in parallel and write data into their respective buffers (4A-A and 4A-B) for I/O node A. The way to store data in the buffers has already been described. The compute node A first writes data (1)-A1 of 4 Kbits (starting address: 0) into the buffer and then writes data (2)-A1 of 4 Kbits (starting address: 8K) into the buffer. This write processing is repeated a certain number of times. When the buffer becomes full as a result or it has been stored with a predetermined amount of data at the time the buffer 4A-B becomes full, the data in that buffer are transferred to the I/O node A. On the other hand, the compute node B first writes data (1)-B1 of 4 Kbits (starting address: 4K) into the buffer 4A-B and then writes 4 Kbits of data (starting address: 12K) into the buffer. This write processing is repeated a certain number of times. When the buffer 4A-B becomes full as a result or it has been stored with a predetermined amount of data at the time the buffer 4A-A becomes full, the data in that buffer are transferred to the I/O node A.

The I/O node A makes a decision as to whether the data thus transferred (data transferred from the buffer in the compute node A or the compute node B, or data transferred from both the compute nodes) are in sequential order and, if they are sequential, writes the data on the disk 7A in accordance with the process flow of FIG. 10. If, on the other hand, the data are not in sequential order, the I/O node A writes the data on the disk 7A in the order in which they were received.

Here, processing when data are alternately transferred from the compute node A and the compute node B and moreover the data from both the compute nodes are in sequential order will be described in accordance with the process flow of FIG. 10.

Upon receipt of data in the buffer 4A-A from the compute node A, the I/O node A makes a decision as to whether the starting address of the first data (1)-A1 in the buffer 4A-A coincides with or smaller than (i.e., contiguous with) the reference address that has been retained since the last writing to disk (S11). In this example, for convenience of explanation, it is assumed that the starting address is contiguous with the reference address. In this case, the I/O node A writes the data (1)-A1 of 4 Kbits in the buffer 4A-A onto a disk area starting at address 0 and sets the reference address to 4K (S12). On the assumption that no data is transferred yet from the compute node B at this point, the I/O node A retrieves the next write data (2)-A1 from the queue (S13).

Here, a decision is made as to whether the starting address of the data (2)-A1 is contiguous with the reference address (S11). Since the reference address is 4K and the starting address of the data (2)-A1 is 8K, the decision is NO. The procedure then goes to the decision in step S15 through step S14. In this example, it is assumed that the data in the buffer 4A-B in the compute node B has been transferred prior to the decision in step S15. The transferred data and the data in the buffer 4A-A in the compute node A are arranged in the order of ascending starting addresses. Thus, the decision in step S15 is Yes. A comparison is then made between the starting address of data at the top of the queue (this data is the smallest in starting address) and the reference address (step S11). Since the reference address (4K) and the starting address (4K) of data at the top of the queue, i.e., the data (1)-B1 in the buffer 4A-B are equal to each other, the I/O node A decides that the data are contiguous (Yes in step S11). As a result, the I/O node A writes the data (1)-B1 of 4 Kbits long on an area of the disk 7A staring at address 4K, and sets the reference address to 8K (step S12).

Even if the data (1)-B1 in the buffer 4A-B has not been received from the compute node B at the time of the decision in step S15, the I/O node A waits for that data for a given period of time. If, therefore, that data is received during that period of time, it will be written on the disk 7A immediately after the data (1)-A1 is written (step S18). However, if the data is not transferred during that time, then the data (2)-A1 will be written on the disk 7A with a space of 4 Kbits left immediately after the data (1)-A1. That is, successive writing to the disk 7A is not performed.

The I/O node A next retrieves the data (2)-A1 from the queue (step S13). A decision is next made as to whether the starting address of the data (2)-A1 is contiguous with the reference address (step S11). Here, the reference address is set to 8K, which is equal to the starting address of the data (2)-A1, 8K. The I/O node A thus decides that the data are contiguous (Yes in step S11), then writes the data (2)-A1 of 4 Kbits in length on an area of the disk that starts at address 8K and sets the reference address to 12K (step S12). The I/O node A next retrieves the data (2)-B1 from the queue (step S13).

Next, a decision is made as to whether the starting address of the data (2)-B1 is contiguous with the reference address (step S11). Here, the reference address is set to 12K, which is equal to the starting address of the data (2)-B1, 12K. The I/O node A thus decides that the data are contiguous (Yes in step S11), then writes the data (2)-B1 of 4 Kbits on an area of the disk that starts at address 12K and sets newts the reference address to 16K (step S12). After that, the same processing is repeated, so that data are written on the disk 7A in sequence as shown in FIG. 12.

The I/O nodes B and C also carry out similar write processing, so that data are written on the disk 7B in the order of (1)-A2, (1)-B2, (2)-A2, . . . , and on the disk 7C in the order of (1)-A3, (1)-B3, (2)-A3, . . . Taking into account that the striping in units of 8 Kbits is specified, the logical view 8 of the final file is made, as shown, up of data that are sequenced in the order of (1)-A1, (1)-B1, (1)-A2, (1)-B2, (1)-A3, (1)-B3, . . . starting at the location of 0th bit. As is seen from the figure, the compute node A-written data are placed in the left column of the view 8, while the compute node B-written data are placed in the right column.

Figure 13:
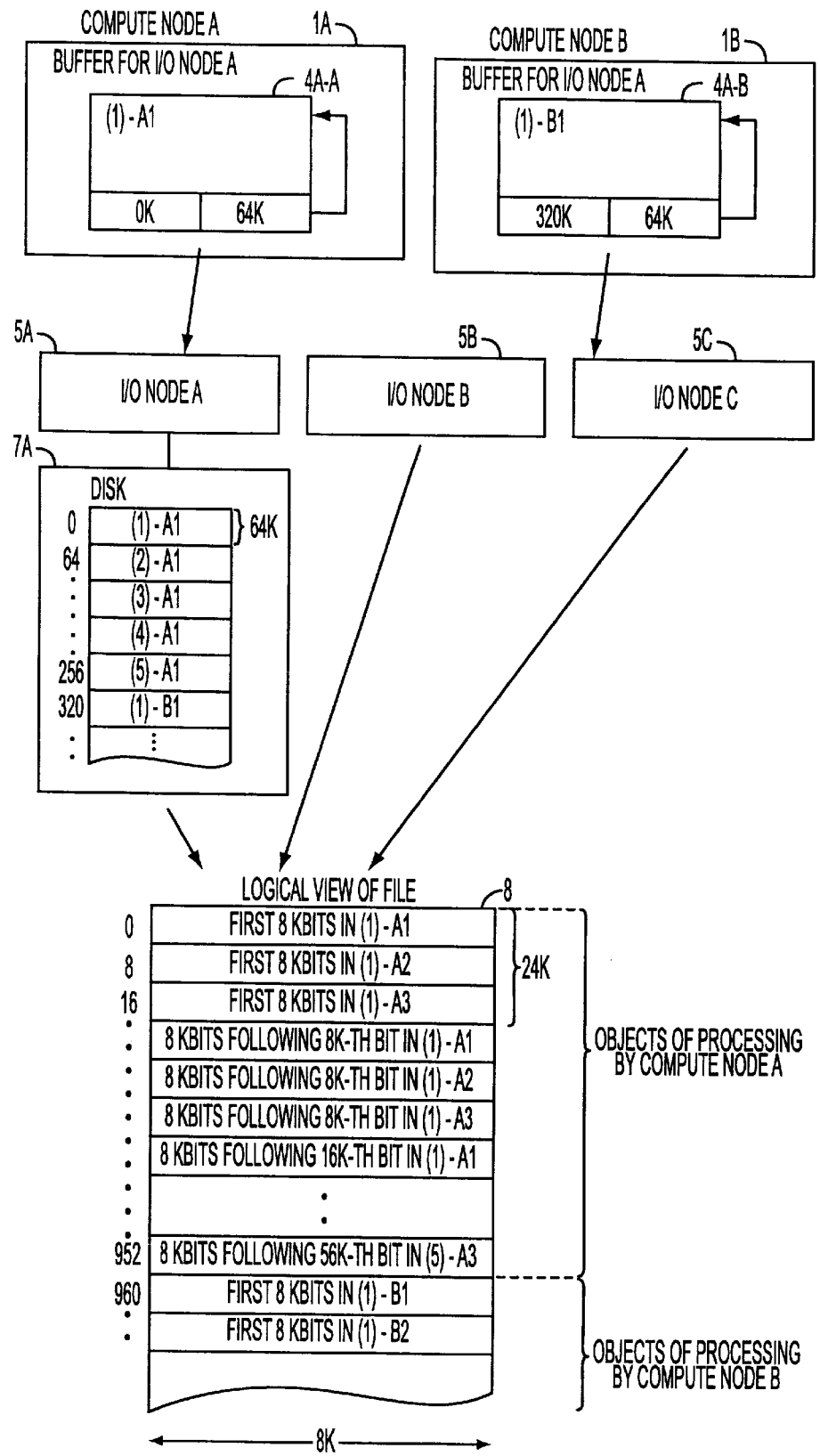
FIG. 13 is a conceptual diagram of another embodiment of the write processing in accordance with the present invention.

FIG. 13 shows how data transferred from the compute nodes A and B to the I/O node A are written on the corresponding physical disk and how they are related to the final logical view in the case where the unit of division for striping is 8 Kbits and the compute nodes A and B alternately write a relatively large amount of data, say, 960 Kbits of data. Though not shown in detail as in FIG. 12, the I/O nodes B and C perform disk write processing similarly to the I/O node A. The final logical view 8 of the file is shown as containing processing by these other I/O nodes.

The figures shown on the left side of the respective rows of the disk 7A and the file logical view 8 shown in FIG. 13 indicate the starting addresses of the respective rows in units of Kbits.

The inventive processing will be described in more detail with reference to FIG. 13. The compute node A and the compute node B perform processing in parallel and write data into their respective buffers (4A-A and 4A-B) for I/O node A. The way to store data in the buffers has already been described. The compute node A writes data (1)-A1 of 64 Kbits (starting address: 0), so that the buffer becomes full of data. The compute node A transfers the data in the buffer to the I/O node A. After that, the compute node A writes data (2)-A1 of 64 Kbits (starting address: 64K) and transfers it to the I/O node A. This processing is repeated a required number of times. The compute node B writes data (1)-B1 of 64 Kbits (starting address: 320K), so that the buffer becomes full. The compute node B then transfers the data in the buffer to the I/O node A. After that, the compute node B writes data (2)-B1 of 64 Kbits (starting address: 384K) and then transfers it to the I/O node A. This processing is repeated a required number of times.

The I/O node A makes a decision as to whether the data thus transferred (data transferred from the buffer in the compute node A or the compute node B, or data transferred from both the compute nodes) are in sequential order and, if they are sequential, writes the data on the disk 7A in accordance with the process flow of FIG. 10. If, on the other hand, the data are not in sequential order, the I/O node A writes the data on the disk 7A in the order in which they were received.

Here, processing when data are alternately transferred from the compute node A and the compute node B and moreover the data from both the compute nodes are in sequential order will be described in accordance with the process flow of FIG. 10.

Upon receipt of the data (1)-A1 in the buffer 4A-A from the compute node A, the I/O node A makes a decision as to whether the starting address of the data (1)-A1 coincides with or is smaller than (i.e., contiguous with) the reference address that has been retained since the last writing to disk (S11). In this example, for convenience of description, it is assumed that the starting address is contiguous with the reference address. In this case, the I/O node A writes the data (1)-A1 of 64 Kbits in the buffer 4A-A onto a disk area starting at address 0 and sets the reference address to 64K (S12). If, at this point, the compute node A has transferred the next data (2)-A1, the I/O node A retrieves it (S13).

Here, a decision is made as to whether the starting address of the data (2)-A1 is contiguous with the reference address (S11). Since the reference address is set to 64K and the starting address of the data (2)-A1 is 64K, the I/O node A decides that the data are contiguous (Yes in step S11), then writes the data (2)-A1 of 64 Kbits in length on an area of the disk 7A that starts at address corresponding to 64 K-th bit, and sets the reference address to 128 Kbits (S12). After that, data from the compute node A are written in succession in the same manner.

If, even when, at the time of retrieval of a request in step S13, data in the buffer 4A-A has not been transferred from the compute node A, but data in the buffer 4A-B (e.g., (1)-B1) has been transferred from the compute node B, data (e.g., (3)-A1) contiguous in address are transferred from the compute node A before a decision is made for arrival of other requests in step S15 or a predetermined time elapses in step S16 or S17, then that data (e.g., (3)-A1) is written in succession on the disk 7A. If no data is transferred from the compute node A within the predetermined time and data have been written through (2)-A1, then data (1)-B1 will be written on an area of the disk 7A starting with address corresponding to 320 K-th bit with a spacing of 192 Kbits from the data (2)-A1.

The last data (5)-A1 from the compute node A is written on an area of the disk 7A starting at address corresponding to 256 K-th bit and next the data (1)-B1 in the buffer of the compute node B is written on an area of the disk 7A starting at address corresponding to 320 K-th bit. After that, data (2)-B1, (3)-B1, . . . are written in succession on the disk 7A in the same way.

The I/O nodes B and C are also carrying out write processing in the same way. Thus, the disk 7B is written with data (1)-A2, (2)-A2, (3)-A2, . . . in the order mentioned, while the disk 7C is written with data (1)-A3, (2)-A3, (3)-A3, . . . in the order mentioned. Taking into account that the striping is specified in units of 8 Kbits, the final file logical view 8 is made, as shown, up of data that are sequenced in the order of the first 8 Kbits in (1)-A1, the first 8 Kbits in (1)-A2, the first 8 Kbits in (1)-A3, 8 Kbits following the first 8 Kbits in (1)-A1, 8 Kbits following the first 8 Kbits in (1)-A2, 8 Kbits following the first 8 Kbits in (1)-A3, etc. As seen from the figure, the data written by the compute node A are placed in the upper rows of the view 8 that correspond in address to 0 to (960 K−1)st bit, while the data written by the compute node B are placed in the lower rows that correspond in address to 960 K-th bit to (1920 K−1)st bit.

Figure 14A:
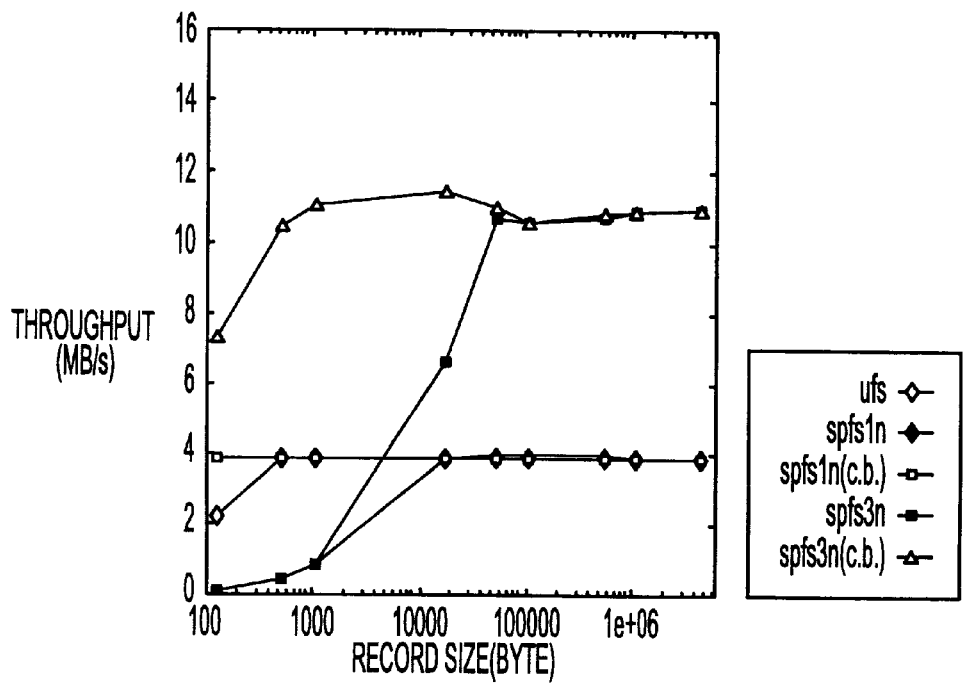
FIG. 14A is a graph showing the results of the inventive and conventional processing for successive write requests.
Figure 14B:
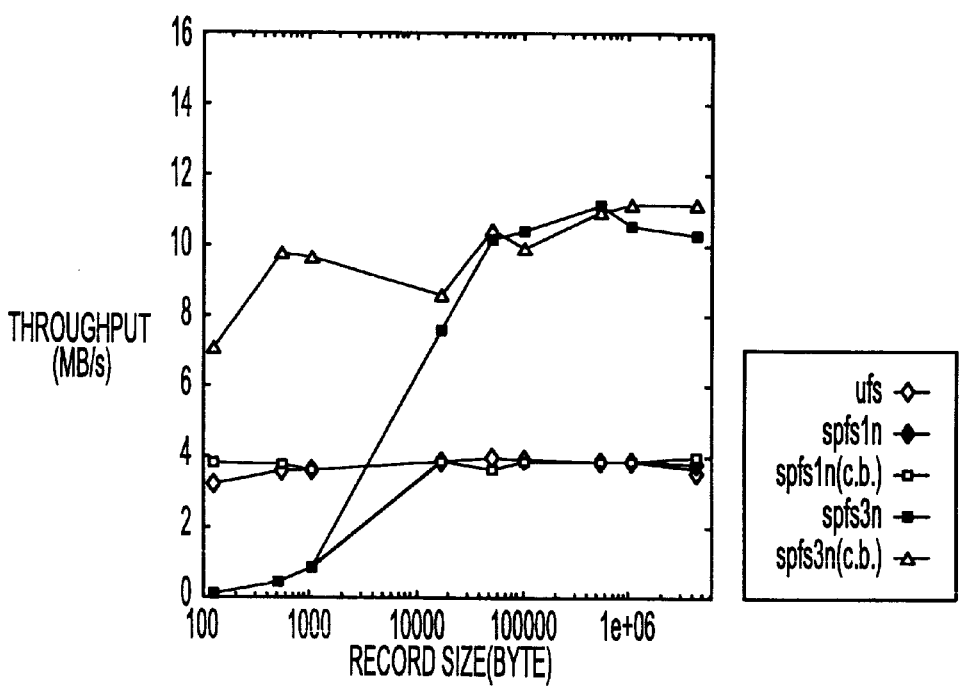
FIG. 14B is a graph showing the results of the inventive and conventional processing for successive read requests.

FIGS. 14A and 14B show the results of the coherent buffer-based processing of the invention and the conventional processing for comparison. Specifically, FIG. 14A shows the results of the processing for successive write requests, while FIG. 14B shows the results of processing for successive read requests.

In these figures, the abscissa indicates the record size of transmit data in bytes, while the ordinate indicates the throughput in megabytes per second. The program running on the compute nodes issues read/write requests having typical UNIX interface. "ufs" indicates, for reference, the results of processing when a local file system was accessed by one I/O node. "tspfsln" indicates the results of processing when no coherent buffer was used with the striping factor set to one (the number of I/O nodes is one). "spfsln(c.b.)" indicates the results of processing when coherent buffers of the present invention were used with the striping factor set to one. "spfs3n" indicates the results of processing when no coherent buffer was used with the striping factor set to three (the number of I/O nodes is three). "spfs3n(c.b.)" indicates the results of processing when the coherent buffers of the present invention were used with the striping factor set to three (the number of I/O nodes is three).

As shown in FIGS. 14A and 14B, the results of processing when no coherent buffer was used indicates that throughput is proportional to the number of I/O nodes, provided that data for which read/write requests are made are sufficiently large in size. With data of small size, however, throughput is considerably low.

On the other hand, the results of processing when the coherent buffers of the present invention were used indicate that throughput is proportional to the number of I/O nodes used irrespective of data length.

Figure 15:
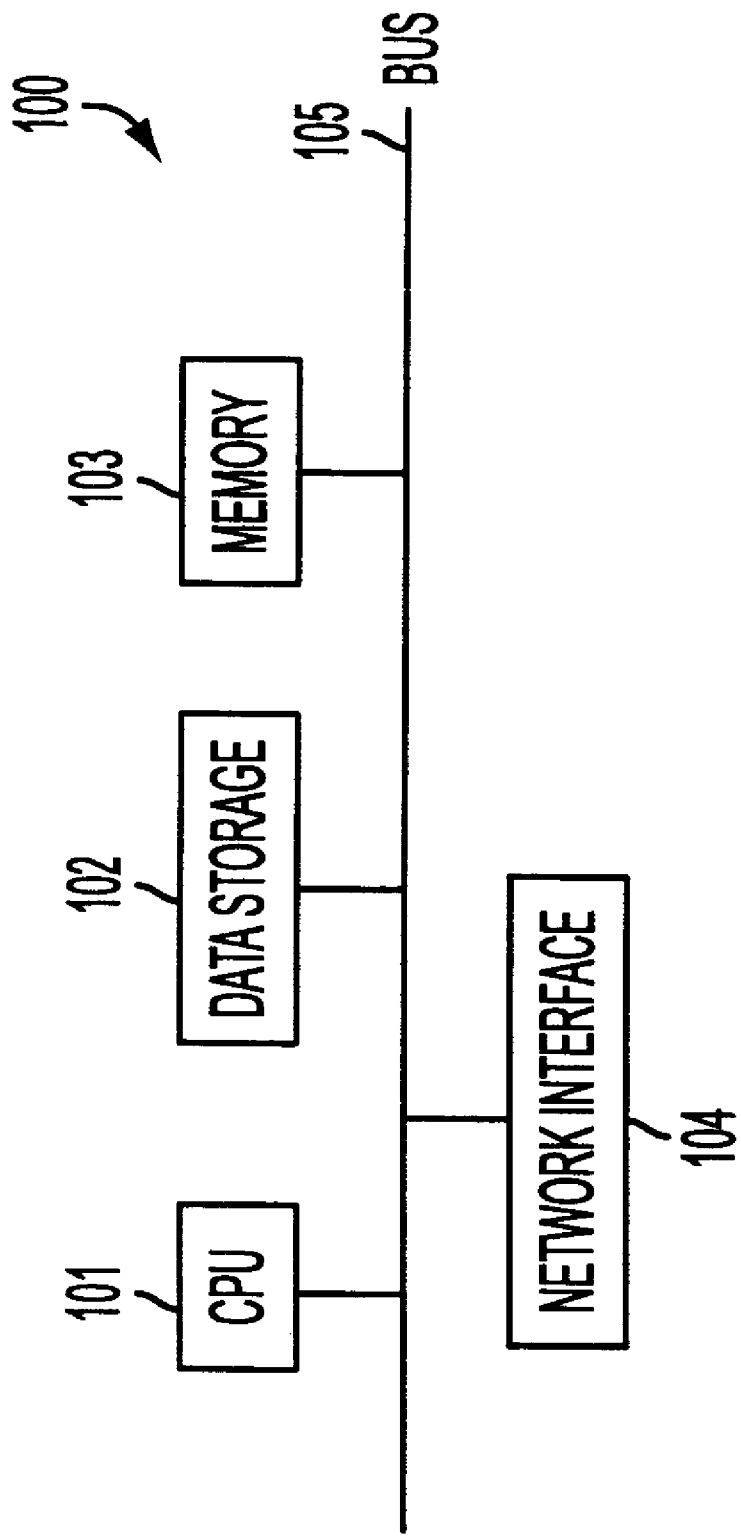
FIG. 15 shows the configuration of a computer which operates the parallel file system according to the present invention.

FIG. 15 shows an example of a hardware configuration of a computer 100 by which the compute nodes A to C (1A to 1C) and the I/O nodes A to C (5A to 5C) are implemented. The computer 100 comprises a CPU 101, a data storage 102, a memory 103, and a network interface 104, which are all connected to a bus 105. The CPU 101 implements the user program 2 running in parallel on the compute nodes A to C (1A to IC), the file system client section 3 that accepts I/O requests made by the user program, and the file system server section 6 operating on the I/O nodes A to C (5A to 5C). The data storage 102 stores programs (2, 3, and 6) that are run by the CPU 101 and data including OS necessary for the system. The memory 103 is loaded with the programs (2, 3, and 6) for execution and temporarily stores write data and the like that are transferred among the programs (2, 3, and 6). The storage and processing of the data have already been described. The network interface 104 interconnects the compute nodes A to C (1A to 1C) and the I/O nodes A to C (5A to 5C) for transfers of write data, update notification, or data invalidation instruct signals between the file system client section 3 and the file system server section 6. The bus 105 is a common transmission line for data and signals among the components.

Though not shown, the computer 100 can be equipped, as required, with a display unit, a printing unit, an input unit, etc.

According to the present invention, as described so far, the I/O performance of an existing user program for write share of a file can be improved significantly by installing a facility which allows a user program running on a compute node to notify the other compute nodes of the time of reflecting the result of a file update, allowing each compute node to update one file concurrently, and arranging I/O requests made by more than one compute node on an I/O node so that disk access can be made most quickly.

Specifically, the present invention provides the following advantages:

(1) A file that resides on a server node can be updated concurrently by more than one client node at high speed without the file becoming destroyed.

(2) In the environment in which a file is striped (I/O node striping) on the disks associated with multiple server nodes, high throughput proportional to the number of the server nodes can be achieved even when data for read/write requests are made by a user program of a small size.

(3) By allowing each client node to have a buffer for each I/O node, the number of times data is copied can be reduced.

(4) Even when the user program running on a client node issues requests which access to non-contiguous locations of a file on a disk in the order of ascending addresses, high throughput can be achieved by evaluating the requests for disk access by more than one client and arranging the order in which the requests are processed so that disk accesses can be made in succession.

(5) Minimal modifications to an existing parallel program that runs on more than one client node allow the performance to be increased.

What is claimed is:

1. A control method for use with a network file system in which a plurality of nodes of computers share a file over a network, each of the plurality of nodes storing at least a portion of the file in a buffer, said method comprising:

storing, when a file update is made by any one of the plurality of nodes, the updated data in the buffer in the node until consistency about the updated data is needed by a program that runs on the node;

making a notification of the file update to the other nodes when a consistency about the updated data is needed by the program;

checking, when the notification is made, whether or not data stored in the buffers in the other nodes corresponds with old data to be updated; and making, if the data corresponding with the old data to be updated is found by the checking, the corresponding data in the other nodes invalid.

2. A control method for use with a network file system in which a plurality of nodes of computers share a file striped on a plurality of server nodes over a network, each of the plurality of nodes storing at least a portion of the file in a buffer which corresponds to one of the server nodes, said method comprising:

temporarily storing, in each client node, data for a write request issued by a user program into the buffers and passing the updated data on to the server nodes collectively at the time when the buffers become full or the buffer contents reach a predetermined amount;

checking, when the data is passed on, whether or not the data in the buffers in the other nodes corresponds with the data to be updated;

making, if the data corresponding with the updated data is found by the checking, the data read-ahead into each of the other nodes invalid; and reading-ahead, in each client node, data from the server nodes into the buffers collectively for a read request issued by the user program, and, for subsequent read request, using the read-ahead data in the buffers if the read-ahead data is not invalid.

3. The control method according to claim 2, wherein if, when one of the buffers becomes full of data for a write request issued by the user program, at least a predetermined amount of the data is stored in the other buffers, and the data in the buffers is simultaneously passed on to the server nodes.

4. The control method according to claim 2, wherein upon receiving from one of the client nodes a request for access to an area of the storage medium which is not contiguous to an area to which the immediately preceding access is made, the server node checks whether a request for a storage medium access by another client node for access to the storage medium has been received and, when received, arranges the requests so that storage medium accesses are made in an order of ascending addresses, and performs input/output processing in accordance with the arranged requests.

5. The control method according to claim 2, further comprising:

monitoring, in the server node, whether requests for access to the storage medium issued by the client nodes are in ascending order of addresses of the storage medium for each of the client nodes;

switching, in the server node, from a nonsequential mode in which access requests are processed in order in which they were accepted, to a sequential mode in which access requests are arranged in ascending order of the storage medium addressed, when a predetermined number of access requests in ascending order of the storage medium addresses is received in succession from each of the client nodes; and switching, in the server node, from the sequential mode to the non-sequential mode when an access request that is not in ascending order of the storage medium addresses is received from one of the client nodes.

6. A network file system in which a plurality of client nodes share a file that has at least a portion stored on a plurality of server nodes over a network, wherein said plurality of client nodes have a file system client section comprising:

a unit managing a plurality of buffers to store access data for the file, each of the buffers corresponding to one of the plurality of server nodes;

a unit processing requests for access to the file made by a parallel program running on the client nodes;

a unit storing, when a file update is made by any one of the plurality of the client nodes, the updated data in the buffer in the client node until consistency about the updated data is needed by the parallel program;

a unit making a notification of the file update to a corresponding server node in response to an instruction from the parallel program when the consistency about the updated data is needed by the parallel program; and a unit invalidating data stored in the other client nodes which corresponds with old data to be updated, in accordance with an invalidation instruction which is produced by the server node in response to the notification of the file update; and the plurality of server nodes have a file system server section comprising a unit processing file access requests from the client nodes; and a unit instructing, in response to the notification of the file update from a client node, the other client nodes that hold data corresponding with the old data to be updated to make the corresponding data invalid.

7. A network file system according to claim 6, wherein the server node comprises a switch unit switching a storage medium access mode between a sequential mode in which requests for access to the storage medium are arranged in ascending order of addresses of the storage medium and a non-sequential mode in which requests for access to the storage medium are processed in order in which they were accepted, and a monitor unit monitoring whether access requests issued by the client nodes are in ascending order of the storage medium addresses for each of the client nodes, and, the switch unit switches from the non-sequential mode to the sequential mode when the monitor unit recognizes that a predetermined number of access requests in ascending order of the storage medium addresses is received in succession from each of the client nodes, and switches from the sequential mode to the non-sequential mode when the monitor unit recognizes that an access request that is not in ascending order of the storage medium addresses is received from any one of the client nodes.

8. The network file system according to claim 6, wherein at least one of the plurality of buffers has a control section and a data section, the control section having a record that stores a disk address and a data length for each read data or each write data and the data section stores the contents of data corresponding to the read data or the write data in each of the records, and when new data of a length is added to the buffer and has addresses contiguous to the disk address of existing data in that buffer, the data length in the control section is replaced with the sum of the length of the new data and the existing data length and the contents of the new data are combined with the contents of the existing data section.

9. A computer readable storage medium for use with a network file system in which a plurality of client nodes share a file that has at least a portion stored on a plurality of server nodes, and storing a process running on each client node, the process comprising:

managing a plurality of buffers to store access data for the file, each of the plurality of buffers being located in one of the plurality of server nodes;

processing file access requests issued by a parallel program running on the client nodes;

storing, when a file update is made by any one of the plurality of client nodes, the updated data in the buffer in the client node until consistency about the updated data is needed by the parallel program;

making a notification of the file update to a corresponding server node in response to an instruction from the parallel program when the consistency about the updated data is needed by the parallel program; and invalidating data stored in the other client nodes which corresponds with old data to be updated, in accordance with an invalidation instruction which is produced by the server node in response to the notification of the file update.

10. A computer readable storage medium for use with a network file system in which a plurality of client nodes share a file that has at least a portion stored on a plurality of server nodes, and storing a process running on each server node, the process comprising:

processing requests for access to the file by the client nodes; and instructing, in response to a notification of file update which is produced by a client node when data in the file is updated by any one of the client nodes and then consistency about the updated data is needed by a parallel program running on the client nodes, the other client nodes that hold data corresponding with old data to be updated to invalidate the corresponding data.

11. A client node for a network file system in which a plurality of client nodes share a file that has at least a portion stored on a plurality of server nodes over a network, each of said plurality of client nodes comprising:

a unit managing a plurality of buffers to store access data for the file, each located in one of the server nodes on which the file is striped;

a write request processing unit storing data for a write request issued by a user program in the buffers and passing the data on to the other server nodes collectively at the time when each buffer becomes full or the buffer contents reach a predetermined amount; and a read request processing unit reading-ahead data from the server nodes into the buffers collectively for a read request made by the user program, and, for a subsequent read request, using the read-ahead data in the buffers.

12. The client node for a network file system according to claim 11, wherein if, when one of the buffers becomes fall of data for a write request issued by the user program, at least a predetermined amount of the data is stored in the other buffers, and the data in the buffer is simultaneously passed on to the server nodes.

13. The client node for a network file system according to claim 11, wherein at least one of the plurality of buffers has a control section and a data section, the control section having a record that stores a disk address and a data length for each read data or each write data and the data section stores the contents of data corresponding to the read data or the write data in each of the records, and when new data of a length is added to the buffer and has addresses contiguous to the disk address of existing data in that buffer, the data length in the control section is replaced with the sum of the length of the new data and the existing data length and the contents of the new data are combined with the contents of the existing data section.

14. A computer readable storage medium for use with a network file system in which a plurality of client nodes share a file that has at least a portion stored on a plurality of server nodes, and storing a process running on each client node, the process comprising:
    managing a plurality of buffers to store access data for the file, each of which corresponds to a respective one of the server nodes on which the file is striped;
    storing data for a write request issued by a user program into the buffers and passing the data on to the server nodes collectively at the time when the buffers become full or the buffer contents reach a predetermined amount; and
    checking, when the data is passed on, whether or not the data in the buffers in the other nodes corresponds with the data to be updated;
    making, if the data corresponding with the updated data is found by the checking, the data read-ahead into each of the other nodes invalid;
    reading-ahead data from the server nodes into the buffers collectively when a read request is issued by the user program, and, for subsequent read request, using the read-ahead data in the buffers, if the read-ahead data is not invalid.

15. A network file system in which a plurality of nodes of computers share a file over a network and each of the plurality of the nodes stores at least a portion of the file, comprising:
    a plurality of buffers, each located in one of the nodes, for storing at least a portion of the file, each buffer in a node storing, when a file update is made by any one of the plurality of nodes, the updated data until consistency about the updated data is needed by a program that runs on the node;
    a notification unit making notification of the file update to other nodes when the consistency about the updated data is needed by the program;
    a check unit checking, when the notification is made by the modification unit, whether or not data stored in the buffers in the other nodes corresponds with old data to be updated; and
    an invalidation unit making, if the data corresponding with the old data to be updated is found by said check unit, the corresponding data invalid.

16. A network file system according to claim 15, wherein each of the server nodes has input/output means which, upon receiving from one of the client nodes a request for access to an area of the storage medium which is not contiguous to an area to which the immediately preceding access is made, checks whether requests by the other client nodes for access to the storage medium have been received and, when received, arranges the requests so that storage medium accesses are made in the order of ascending addresses, and performs input/output processing in accordance with the arranged requests.

17. The network file system according to claim 11, wherein at least one of the plurality of buffers has a control section and a data section, the control section having a record that stores a disk address and a data length for each read data or each write data and the data section stores the contents of data corresponding to the read data or the write data in each of the records, and when new data of a length is added to the buffer and has addresses contiguous to the disk address of existing data in that buffer, the data length in the control section is replaced with the sum of the length of the new data and the existing data length and the contents of the new data are combined with the contents of the existing data section.

18. A control method for a network file system in which a plurality of client nodes share a file that is striped on a plurality of server nodes and each of the plurality of client nodes stores at least a portion of the file in a buffer, said method comprising;
    storing, when a file update is made by any one of the client nodes, the updated data in the buffer in the client node until consistency about the updated data is needed;
    making a notification of the file update to a corresponding server node when the consistency about the updated data is needed; and
    according to an invalidation instruction which is produced by the server node in response to the notification of the file update from the client node, invalidating data stored in the buffer in the other client nodes which corresponds with old data to be updated.

19. A control method for a network file system in which a plurality of client nodes share a file that is stripe-placed on a plurality of server nodes and each of the plurality of client nodes stores at least a portion of the file in a buffer, said method comprising:
    in response to a notification of file update which is produced by any one of the plurality of client nodes when data in the file is updated by the client node and then consistency about the updated data is needed, instructing the other client nodes that hold data corresponding with old data to be updated to invalidate the corresponding data.

20. A program storage medium for storing a program implementing a control method for a network file system in which a plurality of nodes of computers share a file over a network, each of the plurality of nodes storing at least a portion of the file in a buffer, the program comprising:
    storing, when a file update is made by any one of the plurality of nodes, the updated data in the buffer in the node until consistency about the updated data is needed by a program that runs on the node;
    making a notification of the file update to other nodes when the consistency about the updated data is needed by the program;
    checking, when the notification is made, whether or not data stored in the buffers in the other nodes corresponds with old data to be updated; and
    making, if the data corresponding with the old data to be updated is found by the checking, the corresponding data in the other nodes invalid.

21. A program storage medium according to claim 20, further comprising:

upon receiving from one of the client nodes a request for access to an area of the storage medium which is not contiguous to an area to which the immediately preceding access is made, checking, in the server nodes, whether requests by the other client nodes for access to the storage medium have been received and, when received, arranging the requests so that storage medium accesses are made in the order of ascending addresses, and performing input/output processing in accordance with the arranged requests.

22. A program storage medium according to claim 20, further comprising:

monitoring, in the server node, whether requests for access to the storage medium issued by the client nodes are in ascending order of addresses of the storage medium for each of the client nodes;

switching, in the server node, from a nonsequential mode in which access requests are processed in order in which the access requests were accepted, to a sequential mode in which access requests are arranged in ascending order of the storage medium addresses, when a predetermined number of access requests in ascending order of the storage medium addresses is received in succession from each of the client nodes; and switching, in the server node, from the sequential mode to the non-sequential mode when an access request that is not in ascending order of the storage medium addresses is received from any one of the client nodes.

* * * * *

UNITED STATES PATENT AND TRADEMARK OFFICE
CERTIFICATE OF CORRECTION

PATENT NO. : 6,385,624 B1
DATED : May 7, 2002
INVENTOR(S) : Yoshitake Shinkai

It is certified that error appears in the above-identified patent and that said Letters Patent is hereby corrected as shown below:

Column 21,
Line 2, change "fall" to -- full --

Column 22,
Line 10, change "11" to -- 15 --

Signed and Sealed this

Eighth Day of October, 2002

*Attest:*

*Attesting Officer*

JAMES E. ROGAN
*Director of the United States Patent and Trademark Office*